United States Patent
Kang et al.

(10) Patent No.: US 9,967,072 B2
(45) Date of Patent: May 8, 2018

(54) METHOD FOR TRANSMITTING REFERENCE SIGNAL BASED ON ADAPTIVE ANTENNA SCALING IN WIRELESS COMMUNICATION SYSTEM, AND APPARATUS THEREFOR

(71) Applicant: LG ELECTRONICS INC., Seoul (KR)

(72) Inventors: Jiwon Kang, Seoul (KR); Kilbom Lee, Seoul (KR); Kitae Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 97 days.

(21) Appl. No.: 15/115,230

(22) PCT Filed: Jun. 26, 2014

(86) PCT No.: PCT/KR2014/005691
§ 371 (c)(1),
(2) Date: Jul. 28, 2016

(87) PCT Pub. No.: WO2015/115706
PCT Pub. Date: Aug. 6, 2015

(65) Prior Publication Data
US 2016/0344525 A1     Nov. 24, 2016

Related U.S. Application Data

(60) Provisional application No. 61/932,256, filed on Jan. 28, 2014.

(51) Int. Cl.
*H04W 4/00* (2009.01)
*H04L 5/00* (2006.01)
(Continued)

(52) U.S. Cl.
CPC ......... *H04L 5/0048* (2013.01); *H04B 7/0469* (2013.01); *H04B 7/0478* (2013.01);
(Continued)

(58) Field of Classification Search
CPC ..... H04L 5/0023; H04L 5/0028; H04L 5/006; H04L 5/0091; H04L 5/0048;
(Continued)

(56) References Cited

U.S. PATENT DOCUMENTS

2008/0187062 A1    8/2008  Pan et al.
2009/0219838 A1*   9/2009  Jia ................... H04B 7/0417
                                                      370/278
(Continued)

OTHER PUBLICATIONS

PCT International Application No. PCT/KR2014/005691, Written Opinion of the International Searching Authority dated Oct. 22, 2014, 10 pages.

*Primary Examiner* — Faisal Choudhury
(74) *Attorney, Agent, or Firm* — Lee, Hong, Degerman, Kang & Waimey PC

(57) ABSTRACT

A method for transmitting a signal to a receiver by a transmitter in a wireless communication system is disclosed. The method includes transmitting information about a first non-precoded pilot signal and information about a second non-precoded pilot signal to the receiver, transmitting the first non-precoded pilot signal the second non-precoded pilot signal to the receiver, and transmitting one or more transmission streams to the receiver through first logical antenna ports and second logical antenna ports, wherein the number of the first logical antenna ports is less than or equal to the number of the second logical antenna ports, the first non-precoded pilot signal is a pilot signal for measuring channel state information at the receiver, and the second non-precoded pilot signal is a pilot signal for determining the number of the first logical antenna ports.

14 Claims, 14 Drawing Sheets

(51) Int. Cl.
*H04B 7/04* (2017.01)
*H04B 7/06* (2006.01)
*H04W 72/12* (2009.01)

(52) U.S. Cl.
CPC ............ *H04B 7/065* (2013.01); *H04L 5/006* (2013.01); *H04L 5/0023* (2013.01); *H04L 5/0028* (2013.01); *H04L 5/0091* (2013.01); *H04W 72/1226* (2013.01)

(58) Field of Classification Search
CPC ............ H04W 72/1226; H04B 7/0469; H04B 7/0478; H04B 7/065
USPC ........................................................ 370/328
See application file for complete search history.

(56) References Cited

U.S. PATENT DOCUMENTS

| | | | |
|---|---|---|---|
| 2010/0046643 A1 | 2/2010 | Mondal et al. | |
| 2012/0009959 A1 | 1/2012 | Yamada et al. | |
| 2012/0057562 A1 | 3/2012 | Kim et al. | |
| 2013/0128760 A1 | 5/2013 | Fujishima et al. | |
| 2014/0050278 A1* | 2/2014 | Bergman | H04B 7/0404 375/267 |
| 2014/0211723 A1* | 7/2014 | Xia | H04L 5/0051 370/329 |
| 2015/0289155 A1* | 10/2015 | Gao | H04L 5/0057 370/252 |

* cited by examiner

E-UMTS

FIG. 2
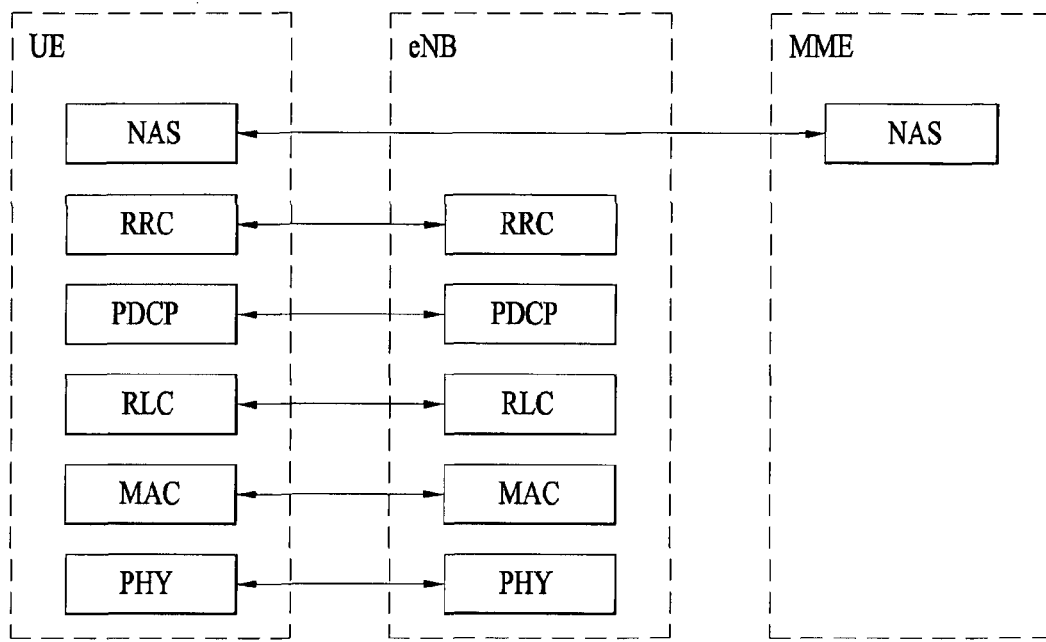
(A) CONTROL-PLANE PROTOCOL STACK
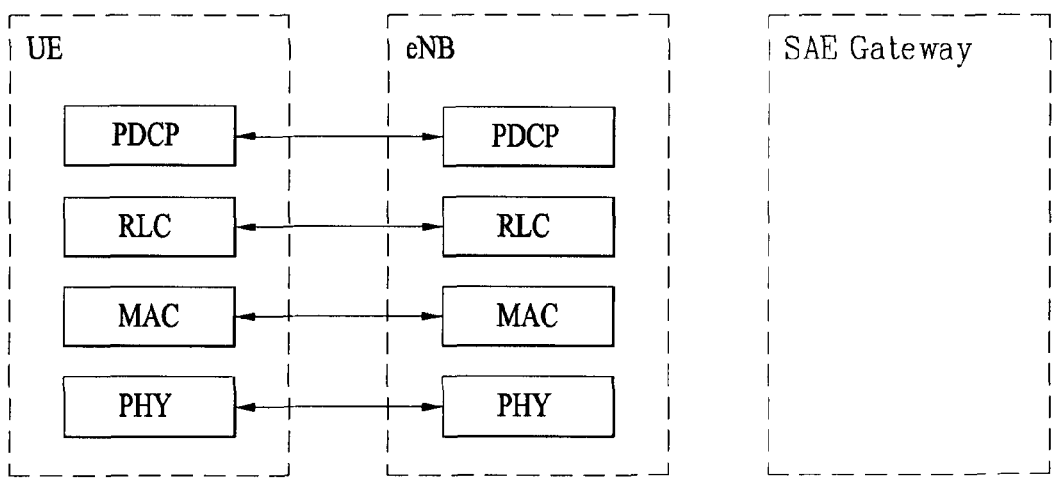
(B) USER-PLANE PROTOCOL STACK

▨ : DMRS GROUP 1

▩ : DMRS GROUP 2

(a) CONVENTIONAL ANTENNA SYSTEM        (b) AAS

METHOD FOR TRANSMITTING REFERENCE SIGNAL BASED ON ADAPTIVE ANTENNA SCALING IN WIRELESS COMMUNICATION SYSTEM, AND APPARATUS THEREFOR

CROSS-REFERENCE TO RELATED APPLICATIONS

This application is the National Stage filing under 35 U.S.C. 371 of International Application No. PCT/KR2014/005691, filed on Jun. 26, 2014, which claims the benefit of U.S. Provisional Application No. 61/932,256, filed on Jan. 28, 2014, the contents of which are all hereby incorporated by reference herein in their entirety.

TECHNICAL FIELD

The present invention relates to a wireless communication system and, more particularly, to a method for transmitting a reference signal based on adaptive antenna scaling in a wireless communication system, and an apparatus therefor.

BACKGROUND ART

As an example of a mobile communication system to which the present invention is applicable, a 3rd generation partnership project long term evolution (hereinafter, referred to as LTE) communication system is described in brief.

FIG. 1 is a diagram schematically illustrating a network structure of an E-UMTS as an exemplary radio communication system. An evolved universal mobile telecommunications system (E-UMTS) is an advanced version of a legacy universal mobile telecommunications system (UMTS) and basic standardization thereof is currently underway in 3GPP. E-UMTS may be generally referred to as an LTE system. For details of the technical specifications of UMTS and E-UMTS, reference can be made to Release 7 and Release 8 of "3rd Generation Partnership Project; Technical Specification Group Radio Access Network".

Referring to FIG. 1, the E-UMTS includes a user equipment (UE), evolved Node Bs (eNode Bs or eNBs), and an access gateway (AG) which is located at an end of an evolved UMTS terrestrial radio access network (E-UTRAN) and connected to an external network. The eNBs may simultaneously transmit multiple data streams for a broadcast service, a multicast service, and/or a unicast service.

One or more cells are present per eNB. A cell is configured to use one of bandwidths of 1.25, 2.5, 5, 10, 15, and 20 MHz to provide a downlink or uplink transmission service to multiple UEs. Different cells may be configured to provide different bandwidths. The eNB controls data transmission and reception to and from a plurality of UEs. Regarding downlink (DL) data, the eNB transmits DL scheduling information to notify a corresponding UE of a time/frequency domain within which data is to be transmitted, coding, data size, and hybrid automatic repeat and request (HARQ)-related information by transmitting DL scheduling information to the UE. In addition, regarding uplink (UL) data, the eNB transmits UL scheduling information to a corresponding UE to inform the UE of an available time/frequency domain, coding, data size, and HARQ-related information. An interface for transmitting user traffic or control traffic between eNBs may be used. A core network (CN) may include the AG and a network node for user registration of the UE. The AG manages mobility of a UE on a tracking area (TA) basis, each TA including a plurality of cells.

Although radio communication technology has been developed up to LTE based on wideband code division multiple access (WCDMA), demands and expectations of users and providers continue to increase. In addition, since other radio access technologies continue to be developed, new advances in technology are required to secure future competitiveness. For example, decrease of cost per bit, increase of service availability, flexible use of a frequency band, a simplified structure, an open interface, appropriate power consumption of a UE, etc. are required.

DISCLOSURE

Technical Problem

An object of the present invention devised to solve the problem lies in providing a method for transmitting a reference signal based on adaptive antenna scaling based in a wireless communication system, and an apparatus therefore.

Technical Solution

A method for transmitting a signal to a receiver by a transmitter in a wireless communication system according to an embodiment of the present invention includes transmitting information about a first non-precoded pilot signal and information about a second non-precoded pilot signal to the receiver; transmitting the first non-precoded pilot signal the second non-precoded pilot signal to the receiver; and transmitting one or more transmission streams to the receiver through first logical antenna ports and second logical antenna ports; wherein the number of the first logical antenna ports is less than or equal to the number of the second logical antenna ports, the first non-precoded pilot signal is a pilot signal for measuring channel state information at the receiver, and the second non-precoded pilot signal is a pilot signal for determining the number of the first logical antenna ports.

A method for receiving a signal from a transmitter by a receiver in a wireless communication system according to another embodiment of the present invention includes receiving information about a first non-precoded pilot signal and information about a second non-precoded pilot signal from the transmitter; receiving the first non-precoded pilot signal the second non-precoded pilot signal from the transmitter; and receiving one or more transmission streams from the transmitter through first logical antenna ports and second logical antenna ports of the transmitter; wherein the number of the first logical antenna ports is less than or equal to the number of the second logical antenna ports, the first non-precoded pilot signal is a pilot signal for measuring channel state information at the receiver, and the second non-precoded pilot signal is a pilot signal for determining the number of the first logical antenna ports.

In the above embodiments, the information about the second non-precoded pilot signal may include information about the number of the second logical antenna ports and information about feedback based on the second non-precoded pilot signal. The information about feedback based on the second non-precoded pilot signal may include at least one of precoding matrix information for mapping the second logical antenna ports and the first logical antenna ports and information about the preferred number of the first logical antenna ports.

The information about the first non-precoded pilot signal may include information about the number of the first logical antenna ports and information about feedback based on the first non-precoded pilot signal. The information about feedback based on the first non-precoded pilot signal may include at least one of precoding matrix information for mapping a transport layer and the first logical antenna ports, channel state information, and a rank indicator.

The first non-precoded pilot signal and the second non-precoded pilot signal may be defined as channel state information reference signals (CSI-RSs) and the information about the first non-precoded pilot signal and the information about the second non-precoded pilot signal may include identities indicating one or more CSI-RS resources.

A transmission period of the second non-precoded pilot signal may be longer than a transmission period of the first non-precoded pilot signal.

Advantageous Effects

According to the embodiments of the present invention, a reference signal can be more efficiently transmitted based on adaptive antenna scaling.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

FIG. 2 is a diagram illustrating structures of a control plane and a user plane of a radio interface protocol between a UE and an E-UTRAN based on the 3GPP radio access network specification.

BEST MODE

Figure 1:
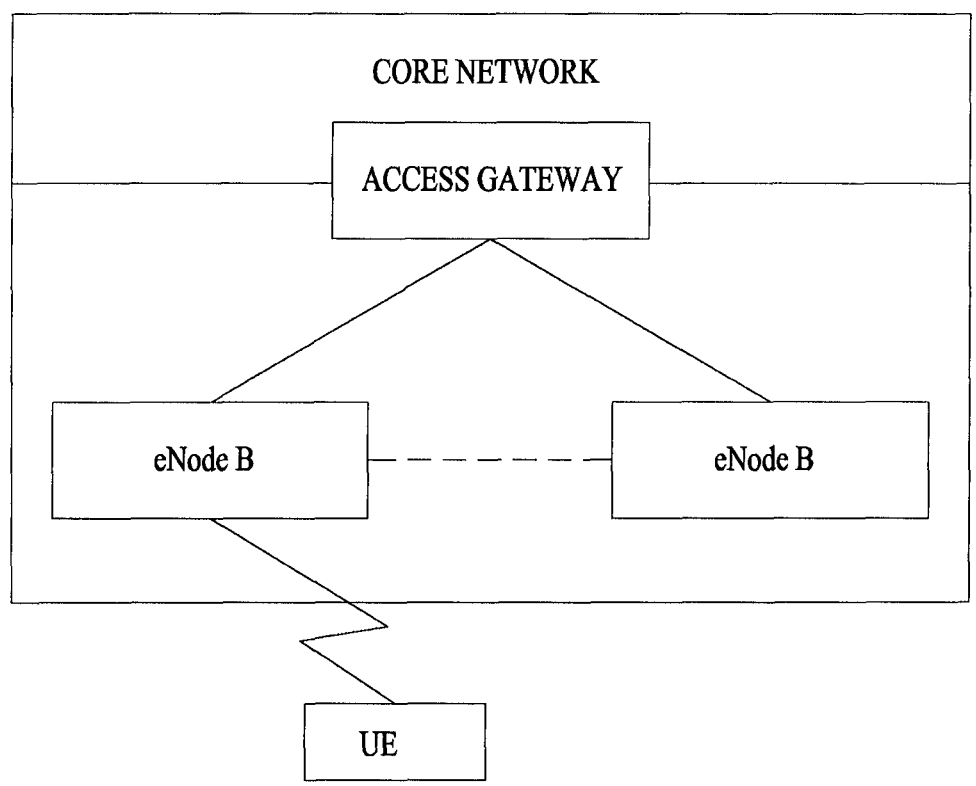
FIG. 1 is a diagram schematically illustrating a network structure of an E-UMTS as an exemplary radio communication system.

Hereinafter, structures, operations, and other features of the present invention will be readily understood from the embodiments of the present invention, examples of which are illustrated in the accompanying drawings. Embodiments which will be described hereinbelow are examples in which technical features of the present invention are applied to a 3GPP system.

Although the embodiments of the present invention will be described based on an LTE system and an LTE-advanced (LTE-A) system, the LTE system and the LTE-A system are purely exemplary and the embodiments of the present invention can be applied to any communication system corresponding to the aforementioned definition. In addition, although the embodiments of the present invention will be described based on frequency division duplexing (FDD), the FDD mode is purely exemplary and the embodiments of the present invention can easily be applied to half-FDD (H-FDD) or time division duplexing (TDD) with some modifications.

In the present disclosure, a base station (eNB) may be used as a broad meaning including a remote radio head (RRH), an eNB, a transmission point (TP), a reception point (RP), a relay, etc.

FIG. 2 is a diagram illustrating structures of a control plane and a user plane of a radio interface protocol between a UE and an E-UTRAN based on 3GPP radio access network specifications. The control plane refers to a path used for transmission of control messages, which is used by the UE and the network to manage a call. The user plane refers to a path in which data generated in an application layer, e.g. voice data or Internet packet data, is transmitted.

A physical layer of a first layer provides an information transfer service to an upper layer using a physical channel. The physical layer is connected to a media access control (MAC) layer of an upper layer via a transmission channel. Data is transmitted between the MAC layer and the physical layer via the transmission channel. Data is also transmitted between a physical layer of a transmitter and a physical layer of a receiver via a physical channel. The physical channel uses time and frequency as radio resources. Specifically, the physical channel is modulated using an orthogonal frequency division multiple Access (OFDMA) scheme in DL and is modulated using a single-carrier frequency division multiple access (SC-FDMA) scheme in UL.

The MAC layer of a second layer provides a service to a radio link control (RLC) layer of an upper layer via a logical channel. The RLC layer of the second layer supports reliable data transmission. The function of the RLC layer may be implemented by a functional block within the MAC layer. A packet data convergence protocol (PDCP) layer of the second layer performs a header compression function to reduce unnecessary control information for efficient transmission of an Internet protocol (IP) packet such as an IPv4 or IPv6 packet in a radio interface having a relatively narrow bandwidth.

A radio resource control (RRC) layer located at the bottommost portion of a third layer is defined only in the control plane. The RRC layer controls logical channels, transmission channels, and physical channels in relation to configuration, re-configuration, and release of radio bearers. A radio bearer refers to a service provided by the second layer to transmit data between the UE and the network. To this end, the RRC layer of the UE and the RRC layer of the network exchange RRC messages. The UE is in an RRC connected mode if an RRC connection has been established between the RRC layer of the radio network and the RRC layer of the UE. Otherwise, the UE is in an RRC idle mode. A non-access stratum (NAS) layer located at an upper level of the RRC layer performs functions such as session management and mobility management.

DL transmission channels for data transmission from the network to the UE include a broadcast channel (BCH) for transmitting system information, a paging channel (PCH) for transmitting paging messages, and a DL shared channel (SCH) for transmitting user traffic or control messages. Traffic or control messages of a DL multicast or broadcast service may be transmitted through the DL SCH or may be transmitted through an additional DL multicast channel (MCH). Meanwhile, UL transmission channels for data transmission from the UE to the network include a random access channel (RACH) for transmitting initial control messages and a UL SCH for transmitting user traffic or control messages. Logical channels, which are located at an upper level of the transmission channels and are mapped to the transmission channels, include a broadcast control channel (BCCH), a paging control channel (PCCH), a common control channel (CCCH), a multicast control channel (MCCH), and a multicast traffic channel (MTCH).

Figure 3:
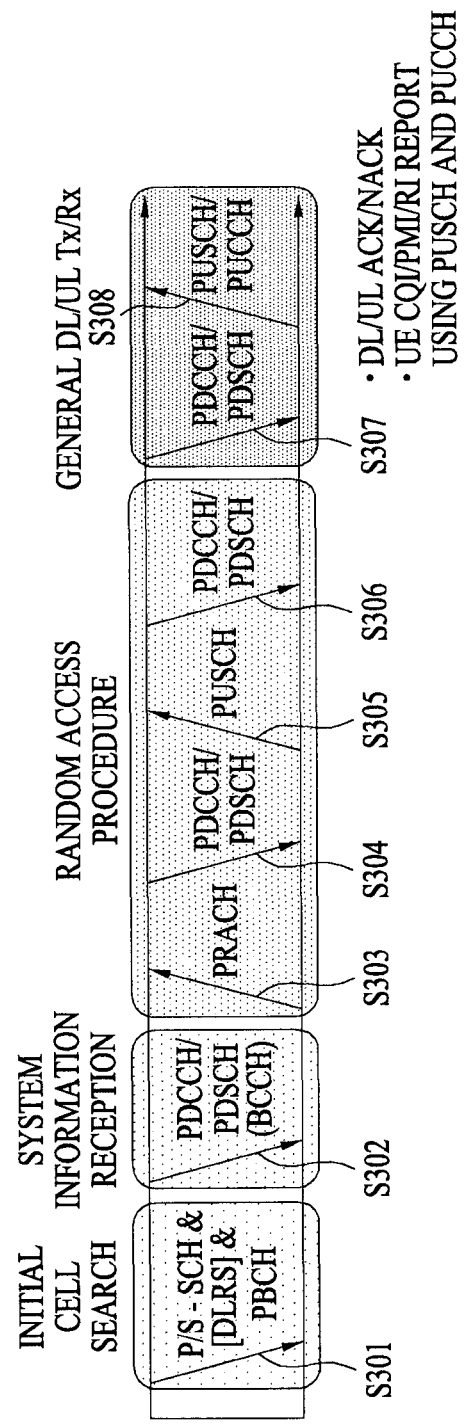
FIG. 3 is a diagram illustrating physical channels used in a 3GPP system and a general signal transmission method using the same.

FIG. 3 is a diagram illustrating physical channels used in a 3GPP system and a general signal transmission method using the same.

When power is turned on or the UE enters a new cell, the UE performs an initial cell search procedure such as acquisition of synchronization with an eNB (S301). To this end, the UE may adjust synchronization with the eNB by receiving a primary synchronization channel (P-SCH) and a secondary synchronization channel (S-SCH) from the eNB and acquire information such as a cell identity (ID). Thereafter, the UE may acquire broadcast information within the cell by receiving a physical broadcast channel from the eNB. In the initial cell search procedure, the UE may monitor a DL channel state by receiving a downlink reference signal (DL RS).

Upon completion of the initial cell search procedure, the UE may acquire more detailed system information by receiving a physical downlink control channel (PDCCH) and receiving a physical downlink shared channel (PDSCH) based on information carried on the PDCCH (S302).

Meanwhile, if the UE initially accesses the eNB or if radio resources for signal transmission to the eNB are not present, the UE may perform a random access procedure (S303 to S306) with the eNB. To this end, the UE may transmit a specific sequence through a physical random access channel (PRACH) as a preamble (S303 and S305) and receive a response message to the preamble through the PDCCH and the PDSCH associated with the PDCCH (S304 and S306). In the case of a contention-based random access procedure, the UE may additionally perform a contention resolution procedure.

After performing the above procedures, the UE may receive a PDCCH/PDSCH (S307) and transmit a physical uplink shared channel (PUSCH)/physical uplink control channel (PUCCH) (S308), as a general UL/DL signal transmission procedure. Especially, the UE receives downlink control information (DCI) through the PDCCH. The DCI includes control information such as resource allocation information for the UE and has different formats according to use purpose thereof.

Meanwhile, control information that the UE transmits to the eNB on UL or receives from the eNB on DL includes a DL/UL acknowledgment/negative acknowledgment (ACK/NACK) signal, a channel quality indicator (CQI), a precoding matrix index (PMI), a rank indicator (RI), and the like. In the 3GPP LTE system, the UE may transmit the control information such as CQI/PMI/RI through a PUSCH and/or a PUCCH.

Figure 4:
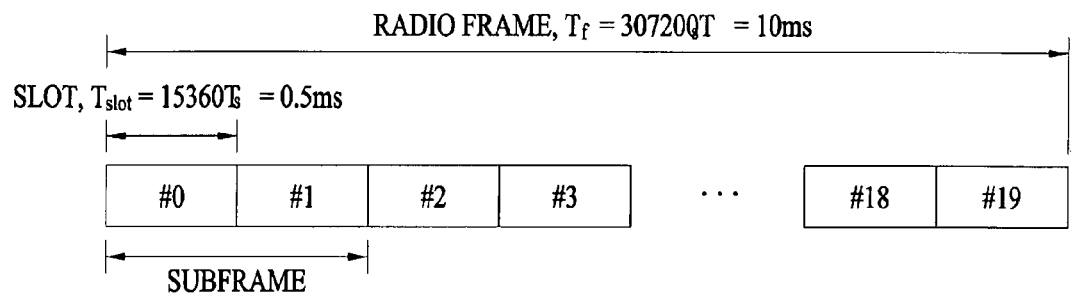
FIG. 4 is a diagram illustrating the structure of a radio frame used in an LTE system.

FIG. 4 is a diagram illustrating the structure of a radio frame used in an LTE system.

Referring to FIG. 4, the radio frame has a length of 10 ms (327200×Ts) and includes 10 equal-sized subframes. Each of the subframes has a length of 1 ms and includes two slots. Each slot has a length of 0.5 ms (15360 Ts). In this case, Ts denotes a sampling time represented by Ts=1/(15 kHz× 2048)=3.2552×10−8 (about 33 ns). Each slot includes a plurality of OFDM symbols in the time domain and includes a plurality of resource blocks (RBs) in the frequency domain. In the LTE system, one RB includes 12 subcarriers×7 (or 6) OFDM symbols. A transmission time interval (TTI), which is a unit time for data transmission, may be determined in units of one or more subframes. The above-described structure of the radio frame is purely exemplary and various modifications may be made in the number of subframes included in a radio frame, the number of slots included in a subframe, or the number of OFDM symbols included in a slot.

Figure 5:
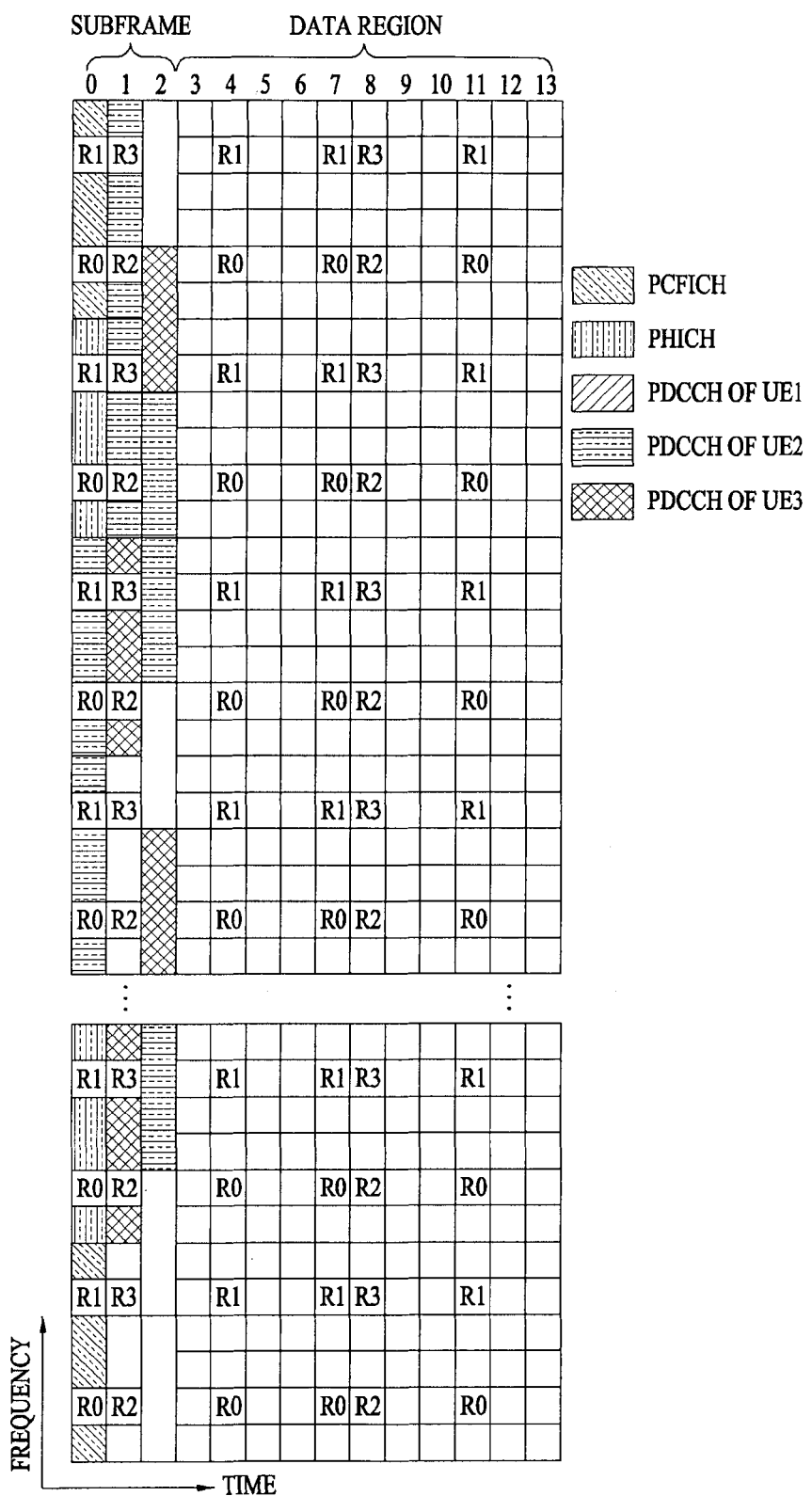
FIG. 5 is a diagram illustrating the structure of a DL radio frame used in an LTE system.

FIG. 5 is a diagram illustrating control channels contained in a control region of one subframe in a DL radio frame.

Referring to FIG. 5, one subframe includes 14 OFDM symbols. The first to third ones of the 14 OFDM symbols may be used as a control region and the remaining 11 to 13 OFDM symbols may be used as a data region, according to subframe configuration. In FIG. 5, R1 to R4 represent reference signals (RSs) or pilot signals for antennas 0 to 3, respectively. The RSs are fixed to a predetermined pattern within the subframe irrespective of the control region and the data region. Control channels are allocated to resources unused for RSs in the control region. Traffic channels are allocated to resources unused for RSs in the data region. The control channels allocated to the control region include a physical control format indicator channel (PCFICH), a physical hybrid-ARQ indicator channel (PHICH), a physical downlink control channel (PDCCH), etc.

The PCFICH, physical control format indicator channel, informs a UE of the number of OFDM symbols used for the PDCCH in every subframe. The PCFICH is located in the first OFDM symbol and is configured with priority over the PHICH and the PDCCH. The PCFICH is composed of 4 resource element groups (REGs) and each of the REGs is distributed over the control region based on a cell ID. One REG includes 4 resource elements (REs). An RE indicates a minimum physical resource defined as one subcarrier by one OFDM symbol. The PCFICH value indicates values of 1 to 3 or values of 2 to 4 depending on bandwidth and is modulated using quadrature phase shift keying (QPSK).

The PHICH, physical hybrid-ARQ indicator channel, is used to carry a HARQ ACK/NACK signal for UL transmission. That is, the PHICH indicates a channel through which DL ACK/NACK information for UL HARQ is transmitted. The PHICH includes one REG and is cell-specifically scrambled. The ACK/NACK signal is indicated by 1 bit and is modulated using binary phase shift keying (BPSK). The modulated ACK/NACK signal is spread with a spreading factor (SF) of 2 or 4. A plurality of PHICHs mapped to the same resource constitutes a PHICH group. The number of PHICHs multiplexed to the PHICH group is determined depending on the number of spreading codes. The PHICH (group) is repeated three times to obtain diversity gain in the frequency domain and/or the time domain.

The PDCCH is allocated to the first n OFDM symbols of a subframe. In this case, n is an integer equal to or greater than 1, indicated by the PCFICH. The PDCCH is composed of one or more control channel elements (CCEs). The PDCCH informs each UE or UE group of information associated with resource allocation of transmission channels, that is, a paging channel (PCH) and a downlink shared channel (DL-SCH), UL scheduling grant, HARQ information, etc. The PCH and the DL-SCH are transmitted through a PDSCH. Therefore, the eNB and the UE transmit and receive data through the PDSCH except for particular control information or service data.

Information indicating to which UE or UEs PDSCH data is to be transmitted and information indicating how UEs should receive and decode the PDSCH data are transmitted on the PDCCH. For example, assuming that a cyclic redundancy check (CRC) of a specific PDCCH is masked by a radio network temporary identity (RNTI) 'A' and information about data transmitted using a radio resource 'B' (e.g. frequency location) and using DCI format 'C', i.e. transport format information (e.g. a transport block size, a modulation scheme, coding information, etc.), is transmitted in a specific subframe, a UE located in a cell monitors the PDCCH, i.e. blind-decodes the PDCCH, using RNTI information thereof in a search space. If one or more UEs having RNTI 'A' are present, the UEs receive the PDCCH and receive a PDSCH indicated by 'B' and 'C' based on the received information of the PDCCH.

Figure 6:
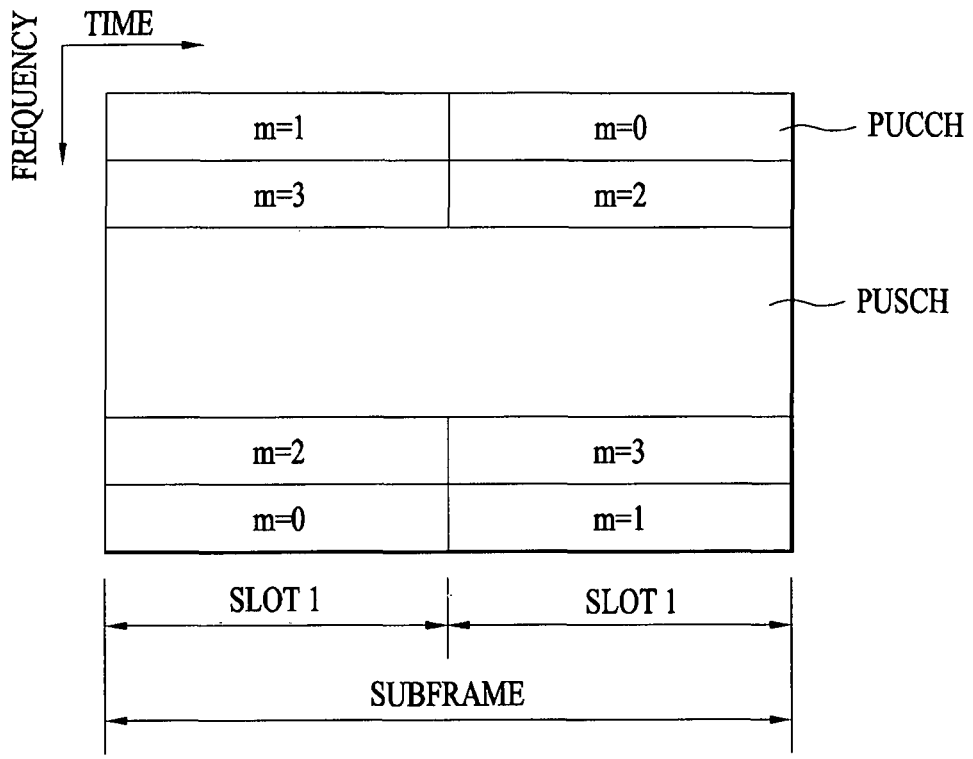
FIG. 6 is a diagram illustrating the structure of a UL subframe in an LTE system.

FIG. 6 is a diagram illustrating the structure of a UL subframe in an LTE system.

Referring to FIG. 6, an uplink subframe is divided into a region to which a PUCCH is allocated to transmit control information and a region to which a PUSCH is allocated to transmit user data. The PUSCH is allocated to the middle of the subframe, whereas the PUCCH is allocated to both ends of a data region in the frequency domain. The control information transmitted on the PUCCH includes an ACK/NACK, a channel quality indicator (CQI) representing a downlink channel state, an RI for Multiple Input and Multiple Output (MIMO), a scheduling request (SR) indicating a request for allocation of UL resources, etc. A PUCCH of a UE uses one RB occupying different frequencies in each slot of a subframe. That is, two RBs allocated to the PUCCH frequency-hop over the slot boundary. Particularly, PUCCHs for m=0, m=1, m=2, and m=3 are allocated to a subframe in FIG. 6.

Hereinafter, a MIMO system will be described. MIMO refers to a method using multiple transmit antennas and multiple receive antennas to improve data transmission/reception efficiency. Namely, a plurality of antennas is used at a transmitter or a receiver of a wireless communication system so that capacity can be increased and performance can be improved. MIMO may also be referred to as multi-antenna in this disclosure.

MIMO technology does not depend on a single antenna path in order to receive a whole message. Instead, MIMO technology completes data by combining data fragments received via multiple antennas. The use of MIMO technology can increase data transmission rate within a cell area of a specific size or extend system coverage at a specific data transmission rate. MIMO technology can be widely used in mobile communication terminals and relay nodes. MIMO technology can overcome a limited transmission capacity encountered with the conventional single-antenna technology in mobile communication.

Figure 7:
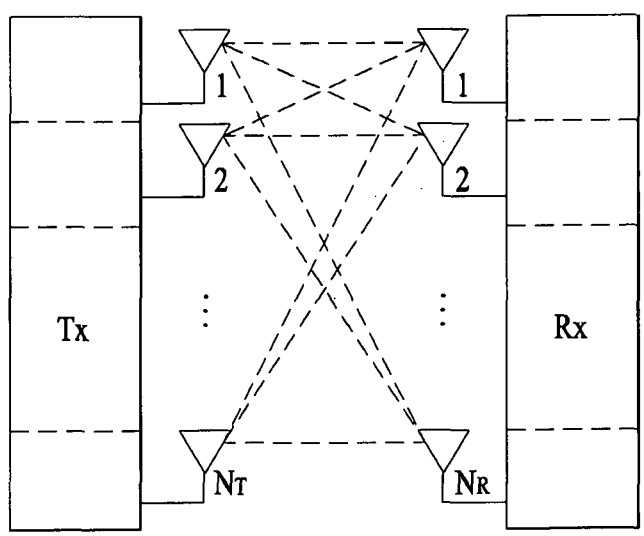
FIG. 7 is a diagram illustrating a configuration of a general MIMO communication system.

FIG. 7 illustrates the configuration of a typical MIMO communication system. A transmitter has $N_T$ transmit (Tx) antennas and a receiver has $N_R$ receive (Rx) antennas. Use of a plurality of antennas at both the transmitter and the receiver increases a theoretical channel transmission capacity, compared to the use of a plurality of antennas at only one of the transmitter and the receiver. Channel transmission capacity increases in proportion to the number of antennas. Therefore, transmission rate and frequency efficiency are increased. Given a maximum transmission rate $R_o$ that may be achieved with a single antenna, the transmission rate may be increased, in theory, to the product of $R_o$ and a transmission rate increase rate $R_i$ in the case of multiple antennas, as indicated by Equation 1. $R_i$ is the smaller of $N_T$ and $N_R$.

$$R_i = \min(N_T, N_R) \quad \text{[Equation 1]}$$

For example, a MIMO communication system with four Tx antennas and four Rx antennas may theoretically achieve a transmission rate four times that of a single antenna system. Since the theoretical capacity increase of the MIMO wireless communication system was verified in the mid-1990s, many techniques have been actively developed to increase data transmission rate in real implementations. Some of these techniques have already been reflected in various wireless communication standards including standards for 3rd generation (3G) mobile communications, next-generation wireless local area networks, etc.

Active research up to now related to MIMO technology has focused upon a number of different aspects, including research into information theory related to MIMO communication capacity calculation in various channel environments and in multiple access environments, research into wireless channel measurement and model derivation of MIMO systems, and research into space-time signal processing technologies for improving transmission reliability and transmission rate.

Communication in a MIMO system will be described in detail through mathematical modeling. It is assumed that $N_T$ Tx antennas and $N_R$ Rx antennas are present as illustrated in FIG. 7. Regarding a transmission signal, up to $N_T$ pieces of information can be transmitted through the $N_T$ Tx antennas, as expressed as the following vector.

$$s = [s_1, s_2, \ldots, s_{N_T}]^T \quad \text{[Equation 2]}$$

Individual pieces of the transmission information $s_1, s_2, \ldots, s_{N_T}$ may have different transmit powers. If the individual transmit powers are denoted by $P_1, P_2, \ldots, P_{N_T}$, respectively, then the transmission power-controlled transmission information may be given as $$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

The transmission power-controlled transmission information vector $\hat{s}$ may be expressed below, using a diagonal matrix P of transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

Meanwhile, $N_T$ transmission signals $x_1, x_2, \ldots, x_{N_T}$ to be actually transmitted may be configured by multiplying the transmission power-controlled information vector $\hat{S}$ by a weight matrix W. The weight matrix W functions to appropriately distribute the transmission information to individual antennas according to transmission channel states, etc. The transmission signals $X_1, X_2, \ldots, X_{N_T}$ are represented as a vector X, which may be determined by Equation 5. Here, $W_{ij}$ denotes a weight of an i-th Tx antenna and a j-th piece of information. W is referred to as a weight matrix or a precoding matrix.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & & \ddots \\ w_{N_T1} & w_{N_T2} & \cdots & w_{N_TN_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = \quad \text{[Equation 5]}$$

$$W\hat{s} = WPs$$

Generally, the physical meaning of the rank of a channel matrix is the maximum number of different pieces of information that can be transmitted on a given channel. Therefore, the rank of a channel matrix is defined as the smaller of the number of independent rows and the number of independent columns in the channel matrix. Accordingly, the rank of the channel matrix is not larger than the number of rows or columns of the channel matrix. The rank of the channel matrix H (rank(H)) is restricted as follows.

$$\text{rank}(H) \leq \min(N_T, N_R) \quad \text{[Equation 6]}$$

A different piece of information transmitted in MIMO is referred to as a transmission stream or stream. A stream may also be called a layer. It is thus concluded that the number of transmission streams is not larger than the rank of channels, i.e. the maximum number of different pieces of transmittable information. Thus, the channel matrix H is determined by $$\text{\# of streams} \leq \text{rank}(H) \leq \min(N_T, N_R) \quad \text{[Equation 7]}$$

"# of streams" denotes the number of streams. It should be noted that one stream may be transmitted through one or more antennas.

One or more streams may be mapped to a plurality of antennas in many ways. This method may be described as follows depending on MIMO schemes. If one stream is transmitted through a plurality of antennas, this may be regarded as spatial diversity. When a plurality of streams is transmitted through a plurality of antennas, this may be spatial multiplexing. A hybrid scheme of spatial diversity and spatial multiplexing may be contemplated.

It is expected that the next-generation mobile communication standard, LTE-A, will support coordinated multipoint (CoMP) transmission in order to increase data transmission rate, compared to the legacy LTE standard. CoMP refers to transmission of data to a UE through cooperation among two or more eNBs or cells in order to increase communication performance between a UE located in a shadow area and an eNB (a cell or sector).

CoMP transmission schemes may be classified into CoMP-Joint processing (CoMP-JP) called cooperative MIMO characterized by data sharing, and CoMP-coordinated scheduling/beamforming (CoMP-CS/CB).

In DL CoMP-JP, a UE may instantaneously receive data simultaneously from eNBs that perform CoMP transmission and may combine the received signals, thereby increasing reception performance (joint transmission (JT)). In addition, one of the eNBs participating in the CoMP transmission may transmit data to the UE at a specific time point (dynamic point selection (DPS)).

In contrast, in downlink CoMP-CS/CB, a UE may receive data instantaneously from one eNB, that is, a serving eNB by beamforming.

In UL CoMP-JP, eNBs may receive a PUSCH signal from a UE at the same time (joint reception (JR)). In contrast, in UL CoMP-CS/CB, only one eNB receives a PUSCH from a UE. Here, cooperative cells (or eNBs) may make a decision as to whether to use CoMP-CS/CB.

Hereinbelow, a description of channel state information (CSI) reporting will be given. In the current LTE standard, a MIMO transmission scheme is categorized into open-loop MIMO operated without CSI and closed-loop MIMO operated based on CSI. Especially, according to the closed-loop MIMO system, each of the eNB and the UE may be able to perform beamforming based on CSI in order to obtain multiplexing gain of MIMO antennas. To acquire CSI from the UE, the eNB transmits RSs to the UE and commands the UE to feed back CSI measured based on the RSs through a PUCCH or a PUSCH.

CSI is divided into three types of information: an RI, a PMI, and a CQI. First, RI is information on a channel rank as described above and indicates the number of streams that can be received via the same time-frequency resource. Since RI is determined by long-term fading of a channel, it may be generally fed back at a cycle longer than that of PMI or CQI.

Second, PMI is a value reflecting a spatial characteristic of a channel and indicates a precoding matrix index of the eNB preferred by the UE based on a metric of signal-to-interference plus noise ratio (SINR). Lastly, CQI is information indicating the strength of a channel and indicates a reception SINR obtainable when the eNB uses PMI.

An advanced system such as an LTE-A system considers additional multi-user diversity through multi-user MIMO (MU-MIMO). Due to interference between UEs multiplexed in an antenna domain in MU-MIMO, the accuracy of CSI may significantly affect interference with other multiplexed UEs as well as a UE that reports the CSI. Accordingly, more accurate CSI than in single-user MIMO (SU-MIMO) should be reported in MU-MIMO.

In this context, the LTE-A standard has determined to separately design a final PMI as a long-term and/or wideband PMI, W1, and a short-term and/or subband PMI, W2.

For example, a long-term covariance matrix of channels expressed as Equation 8 may be used for hierarchical codebook transformation that configures one final PMI with W1 and W2.

$$W = \text{norm}(W1W2) \quad \text{[Equation 8]}$$

In Equation 8, W2 is a short-term PMI, which is a codeword of a codebook reflecting short-term channel information, W is a codeword of a final codebook, and norm(A) is a matrix obtained by normalizing each column of matrix A to 1.

Conventionally, the codewords W1 and W2 are given as Equation 9.

$$W1(i) = \begin{bmatrix} X_i & 0 \\ 0 & X_i \end{bmatrix},$$ [Equation 9]

where $X_i$ is Nt/2 by M matrix.

$$W2(j) = \begin{bmatrix} \overset{r\ columns}{e_M^k} & e_M^l & & e_M^m \\ & & \cdots & \\ \alpha_j e_M^k & \beta_j e_M^l & & \gamma_j e_M^m \end{bmatrix}$$

(if rank=r), where $1 \leq k,l,m \leq M$ and k,l,m are integer.

In Equation 9, the codewords are designed so as to reflect correlation characteristics between established channels, if cross-polarized antennas are densely arranged, for example, the distance between adjacent antennas is equal to or less than half a signal wavelength. The cross-polarized antennas may be divided into a horizontal antenna group and a vertical antenna group and the two antenna groups are co-located, each having the property of a uniform linear array (ULA) antenna.

Therefore, the correlations between antennas in each group have the same linear phase increment property and the correlation between the antenna groups is characterized by phase rotation. Since a codebook is quantized values of channels, it is necessary to design a codebook reflecting channel characteristics. For convenience of description, a rank-1 codeword designed in the above manner may be given as Equation 10.

$$W1(i)^* W2(j) = \begin{bmatrix} X_i(k) \\ \alpha_j X_i(k) \end{bmatrix}$$ [Equation 10]

In Equation 10, a codeword is expressed as an $N_T \times 1$ vector where NT is the number of Tx antennas and the codeword is composed of an upper vector $X_i(k)$ and a lower vector $\alpha_j X_i(k)$, representing the correlation characteristics of the horizontal and vertical antenna groups, respectively. $X_i(k)$ is expressed as a vector having the linear phase increment property, reflecting the correlation characteristics between antennas in each antenna group. For example, a discrete Fourier transform (DFT) matrix may be used for $X_i(k)$.

An advanced system such as an LTE-A system considers achievement of an additional multi-user diversity by the use of MU-MIMO. Due to the existence of interference channels between UEs multiplexed in an antenna domain in MU-MIMO, the accuracy of CSI may significantly affect interference with other multiplexed UEs as well as a UE that reports the CSI. Accordingly, more accurate CSI than in SU-MIMO should be reported in MU-MIMO.

In CoMP JT, because a plurality of eNBs transmits the same data to a specific UE through cooperation, the eNBs may be theoretically regarded as forming a MIMO system with antennas distributed geographically. That is, even when MU-MIMO is implemented in JT, highly accurate CSI is required to avoid interference between CoMP-scheduled UEs as in a single cell MU-MIMO operation. The same applies to CoMP CB. That is, to avoid interference with a serving cell caused by a neighbor cell, accurate CSI is needed. In general, a UE needs to report an additional CSI feedback in order to increase the accuracy of CSI feedback. The CSI feedback is transmitted on a PUCCH or a PUSCH to an eNB.

Hereinbelow, transmission modes for a DL data channel will be described. A current 3GPP LTE standard specification, 3GPP TS 36.213, defines DL data channel transmission modes as illustrated in Table 1. A DL data channel transmission mode is indicated to a UE by higher-layer signaling, that is, RRC signaling.

TABLE 1

| Transmission mode | DCI format | Transmission scheme of PDSCH corresponding to PDCCH |
|---|---|---|
| Mode 1 | DCI format 1A | Single-antenna port, port 0 |
| | DCI format 1 | Single-antenna port, port 0 |
| Mode 2 | DCI format 1A | Transmit diversity |
| | DCI format 1 | Transmit diversity |
| Mode 3 | DCI format 1A | Transmit diversity |
| | DCI format 2A | Large delay CDD or Transmit diversity |
| Mode 4 | DCI format 1A | Transmit diversity |
| | DCI format 2 | Closed-loop spatial multiplexing or Transmit diversity |
| Mode 5 | DCI format 1A | Transmit diversity |
| | DCI format 1D | Multi-user MIMO |
| Mode 6 | DCI format 1A | Transmit diversity |
| | DCI format 1B | Closed-loop spatial multiplexing using a single transmission layer |
| Mode 7 | DCI format 1A | If the number of PBCH antenna ports is one, Single-antenna port, port 0 is used, otherwise Transmit diversity |
| | DCI format 1 | Single-antenna port, port 5 |
| Mode 8 | DCI format 1A | If the number of PBCH antenna ports is one, Single-antenna port, port 0 is used, otherwise Transmit diversity |
| | DCI format 2B | Dual layer transmission, port 7 and 8 or single-antenna port, port 7 or 8 |
| Mode 9 | DCI format 1A | Non-MBSFN subframe: If the number of PBCH antenna ports is one, Single-antenna port, port 0 is used, otherwise Transmit diversity MBSFN subframe: Single-antenna port, port 7 |
| | DCI format 2C | Up to 8 layer transmission, ports 7-14 or single-antenna port, port 7 or 8 |
| Mode 10 | DCI format 1A | Non-MBSFN subframe: If the number of PBCH antenna ports is one, Single-antenna port, port 0 is used, otherwise Transmit diversity MBSFN subframe: Single-antenna port, port 7 |
| | DCI format 2D | Up to 8 layer transmission, ports 7-14 or single-antenna port, port 7 or 8 |

Referring to Table 1, the current 3GPP LTE standard specification defines transmission modes and DCI formats corresponding to the transmission modes. DCI format 1A is additionally defined for application irrespective of transmission modes, that is, for a fallback mode. As an example of operation regarding transmission modes, if DCI format 1B is detected as a result of blind-decoding a PDCCH in Table 1, a PDSCH is decoded under the assumption that the PDSCH is transmitted by closed-loop multiplexing using a single layer.

In Table 1, transmission mode 10 represents a DL data channel transmission mode of the above-described CoMP transmission scheme. For example, if DCI format 2D is detected as a result of a UE blind-decoding the PDCCH, the PDSCH is decoded under the assumption that the PDSCH has been transmitted by a multi-antenna transmission scheme through antenna port 7 to antenna port 14, that is, based on demodulation RSs (DM-RSs). Alternatively, the UE decodes the PDSCH assuming that the PDSCH has been transmitted by a single-antenna transmission scheme based on DM-RS antenna port 7 or DM-RS antenna port 8.

On the other hand, if DCI format 1A is detected as a result of blind-decoding the PDCCH, a transmission mode differs according to whether an associated subframe is an MBSFN subframe. For example, the associated subframe is a non-MBSFN subframe, the UE decodes the PDSCH assuming that the PDSCH has been transmitted by a single-antenna transmission scheme based on CRS of antenna port 0 or by a CRS based transmit diversity scheme. If the associated subframe is an MBSFN subframe, the UE decodes the PDSCH assuming that the PDSCH has been transmitted by a single-antenna transmission scheme based on DM-RS of antenna port 7.

Now a detailed description of an RS will be given.

In general, a transmitter transmits an RS known to both the transmitter and a receiver to the receiver along with data so that the receiver may perform channel measurement in the RS. The RS serves to perform demodulation by indicating a modulation scheme as well as channel measurement. The RS is classified into a dedicated RS (DRS) for a specific UE and a common RS (or cell-specific RS (CRS)) for all UEs within a cell. The CRS includes an RS used by a UE to measure a CQI/PMI/RI to be reported to an eNB. This RS is referred to as a channel state information-RS (CSI-RS).

Figure 8:
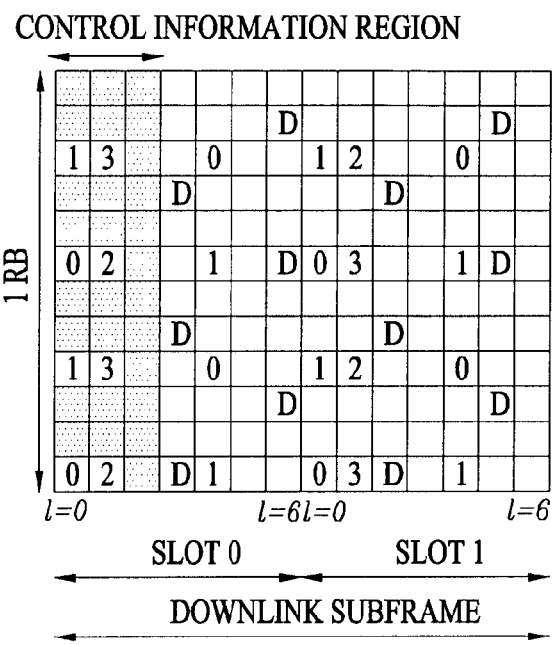
FIGS. 8 and 9 are diagrams illustrating DL RS configurations in an LTE system supporting DL transmission through four antennas.
Figure 9:
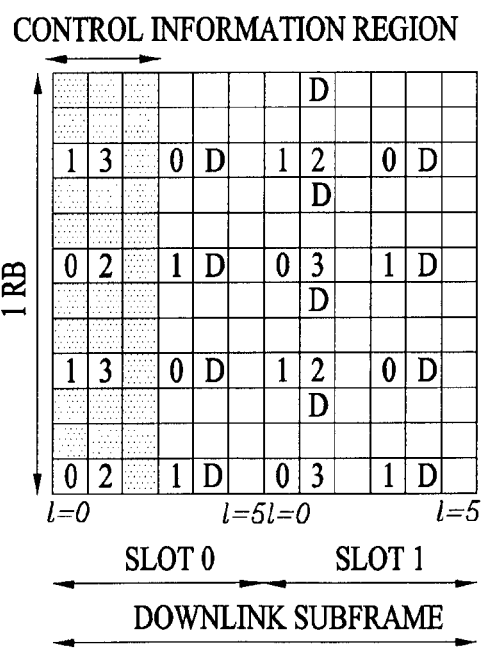

FIGS. 8 and 9 illustrate RS configurations in an LTE system supporting DL transmission through four antennas. Specifically, FIG. 8 illustrates an RS configuration in the case of a normal CP and FIG. 9 illustrates an RS configuration in the case of an extended CP.

Referring to FIGS. 8 and 9, reference numerals 0 to 3 indicated in grids denote cell-specific RSs, CRSs, transmitted through antenna port 0 to antenna port 3, for channel measurement and data modulation. The CRSs may be transmitted to UEs across a control information region as well as a data information region.

Reference character D indicated in grids denotes a UE-specific RS, i.e. a DM-RS. M-RSs are transmitted in a data region, that is, on a PDSCH, to support single-antenna port transmission. The existence/absence of a UE-specific RS, DM-RS, is indicated to a UE by higher-layer signaling. In FIGS. 8 and 9, the DM-RSs are transmitted through antenna port 5. 3GPP TS 36.211 defines DM-RSs for a total of eight antenna ports, antenna port 7 to antenna port 14.

Figure 10:
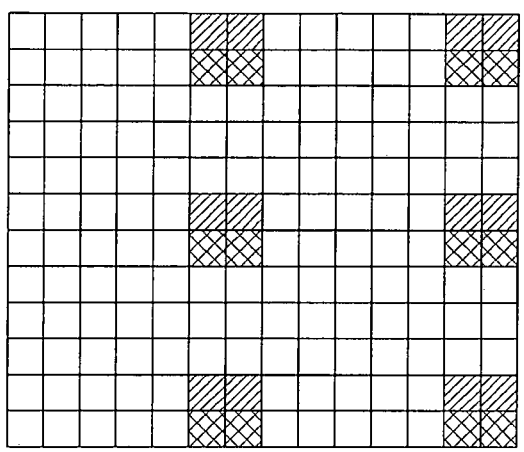
FIG. 10 illustrates exemplary DL DM-RS allocation defined in a current 3GPP standard specification.

FIG. 10 illustrates exemplary DL DM-RS allocation defined in a current 3GPP standard specification.

Referring to FIG. 10, DM-RSs for antenna ports 7, 8, 11, and 13 are mapped using sequences for the respective antenna ports in DM-RS group 1, whereas DM-RSs for antenna ports 9, 10, 12, and 14 are mapped using sequences for the respective antenna ports in DM-RS group 2.

As compared to CRS, CSI-RS was proposed for channel measurement of a PDSCH and up to 32 different resource configurations are available for CSI-RS to reduce inter-cell interference (ICI) in a multi-cell environment.

A different CSI-RS (resource) configuration is used according to the number of antenna ports and adjacent cells transmit CSI-RSs according to different (resource) configurations, if possible. Unlike CRS, CSI-RS supports up to eight antenna ports and a total of eight antenna ports from antenna port 15 to antenna port 22 are allocated to CSI-RS in the 3GPP standard. Table 2 and Table 3 list CSI-RS configurations defined in the 3GPP standard. Specifically, Table 2 lists CSI-RS configurations in the case of a normal CP and Table 3 lists CSI-RS configurations in the case of an extended CP.

TABLE 2

| | CSI reference signal configuration | Number of CSI reference signals configured | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| Frame structure type 1 and 2 | 0 | (9, 5) | 0 | (9, 5) | 0 | (9, 5) | 0 |
| | 1 | (11, 2) | 1 | (11, 2) | 1 | (11, 2) | 1 |
| | 2 | (9, 2) | 1 | (9, 2) | 1 | (9, 2) | 1 |
| | 3 | (7, 2) | 1 | (7, 2) | 1 | (7, 2) | 1 |
| | 4 | (9, 5) | 1 | (9, 5) | 1 | (9, 5) | 1 |
| | 5 | (8, 5) | 0 | (8, 5) | 0 | | |
| | 6 | (10, 2) | 1 | (10, 2) | 1 | | |
| | 7 | (8, 2) | 1 | (8, 2) | 1 | | |
| | 8 | (6, 2) | 1 | (6, 2) | 1 | | |
| | 9 | (8, 5) | 1 | (8, 5) | 1 | | |
| | 10 | (3, 5) | 0 | | | | |
| | 11 | (2, 5) | 0 | | | | |
| | 12 | (5, 2) | 1 | | | | |
| | 13 | (4, 2) | 1 | | | | |
| | 14 | (3, 2) | 1 | | | | |
| | 15 | (2, 2) | 1 | | | | |
| | 16 | (1, 2) | 1 | | | | |
| | 17 | (0, 2) | 1 | | | | |
| | 18 | (3, 5) | 1 | | | | |
| | 19 | (2, 5) | 1 | | | | |
| Frame structure type 2 only | 20 | (11, 1) | 1 | (11, 1) | 1 | (11, 1) | 1 |
| | 21 | (9, 1) | 1 | (9, 1) | 1 | (9, 1) | 1 |
| | 22 | (7, 1) | 1 | (7, 1) | 1 | (7, 1) | 1 |
| | 23 | (10, 1) | 1 | (10, 1) | 1 | | |
| | 24 | (8, 1) | 1 | (8, 1) | 1 | | |
| | 25 | (6, 1) | 1 | (6, 1) | 1 | | |
| | 26 | (5, 1) | 1 | | | | |
| | 27 | (4, 1) | 1 | | | | |
| | 28 | (3, 1) | 1 | | | | |
| | 29 | (2, 1) | 1 | | | | |
| | 30 | (1, 1) | 1 | | | | |
| | 31 | (0, 1) | 1 | | | | |

TABLE 3

| | CSI reference signal configuration | Number of CSI reference signals configured | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| Frame structure type 1 and 2 | 0 | (11, 4) | 0 | (11, 4) | 0 | (11, 4) | 0 |
| | 1 | (9, 4) | 0 | (9, 4) | 0 | (9, 4) | 0 |
| | 2 | (10, 4) | 1 | (10, 4) | 1 | (10, 4) | 1 |
| | 3 | (9, 4) | 1 | (9, 4) | 1 | (9, 4) | 1 |
| | 4 | (5, 4) | 0 | (5, 4) | 0 | | |
| | 5 | (3, 4) | 0 | (3, 4) | 0 | | |
| | 6 | (4, 4) | 1 | (4, 4) | 1 | | |
| | 7 | (3, 4) | 1 | (3, 4) | 1 | | |
| | 8 | (8, 4) | 0 | | | | |
| | 9 | (6, 4) | 0 | | | | |
| | 10 | (2, 4) | 0 | | | | |
| | 11 | (0, 4) | 0 | | | | |
| | 12 | (7, 4) | 1 | | | | |
| | 13 | (6, 4) | 1 | | | | |
| | 14 | (1, 4) | 1 | | | | |
| | 15 | (0, 4) | 1 | | | | |
| Frame structure type 2 only | 16 | (11, 1) | 1 | (11, 1) | 1 | (11, 1) | 1 |
| | 17 | (10, 1) | 1 | (10, 1) | 1 | (10, 1) | 1 |
| | 18 | (9, 1) | 1 | (9, 1) | 1 | (9, 1) | 1 |
| | 19 | (5, 1) | 1 | (5, 1) | 1 | | |
| | 20 | (4, 1) | 1 | (4, 1) | 1 | | |
| | 21 | (3, 1) | 1 | (3, 1) | 1 | | |
| | 22 | (8, 1) | 1 | | | | |
| | 23 | (7, 1) | 1 | | | | |
| | 24 | (6, 1) | 1 | | | | |
| | 25 | (2, 1) | 1 | | | | |
| | 26 | (1, 1) | 1 | | | | |
| | 27 | (0, 1) | 1 | | | | |

Figure 11:
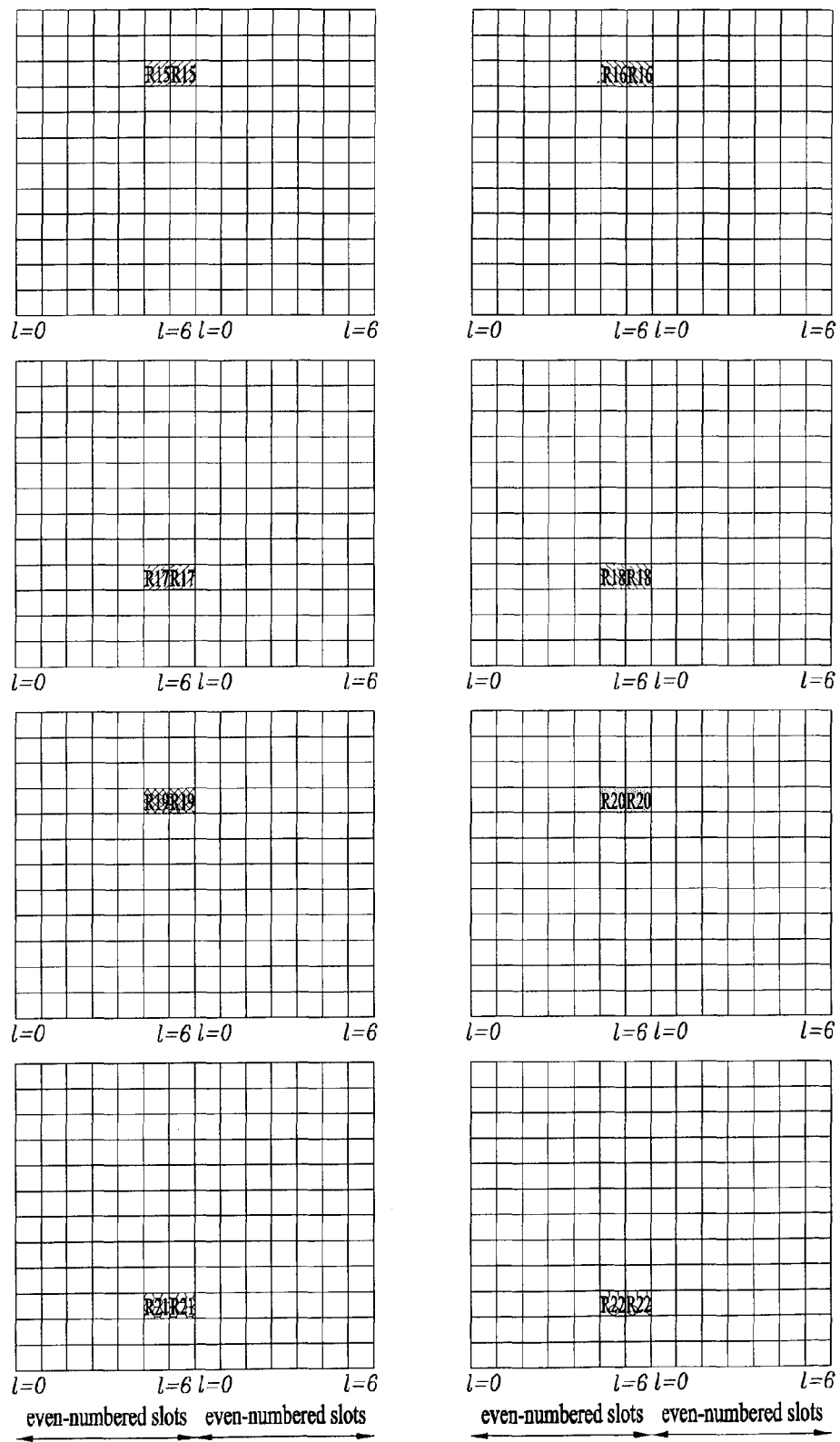
FIG. 11 illustrates CSI-RS configuration #0 of DL CSI-RS configurations defined in the current 3GPP standard.

In Table 2 and Table 3, (k',l') represents an RE index where k' is a subcarrier index and l' is an OFDM symbol index. FIG. 11 illustrates CSI-RS configuration #0 of DL CSI-RS configurations defined in the current 3GPP standard.

In addition, a CSI-RS subframe configuration may be defined by a periodicity in subframes, $T_{CSI-RS}$, and a subframe offset $\Delta_{CSI-RS}$. Table 4 lists CSI-RS subframe configurations defined in the 3GPP standard.

TABLE 4

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
| --- | --- | --- |
| 0-4 | 5 | $I_{CSI-RS}$ |
| 5-14 | 10 | $I_{CSI-RS}$-5 |
| 15-34 | 20 | $I_{CSI-RS}$-15 |
| 35-74 | 40 | $I_{CSI-RS}$-35 |
| 75-154 | 80 | $I_{CSI-RS}$-75 |

Meanwhile, information about a zero power (ZP) CSI-RS is configured through an RRC layer signal. Particularly, a ZP CSI-RS resource configuration includes zeroTxPowerSubframeConfig and zeroTxPowerResourceConfigList of a 16-bit bitmap. zeroTxPowerSubframeConfig indicates a CSI-RS transmission periodicity and subframe offset of a ZP CSI-RS by $I_{CSI-RS}$ illustrated in Table 4. zeroTxPowerResourceConfigList indicates a ZP CSI-RS configuration. The elements of this bitmap indicate the respective configurations included in the columns for four CSI-RS antenna ports in Table 2 or Table 3. A normal CSI-RS other than ZP CSI-RS is referred to as non zero-power (NZP) CSI-RS.

When the above-described CoMP scheme is applied, a plurality of CSI-RS configurations may be signaled to the UE through an RRC layer signal. The CSI-RS configurations are defined as listed in Table 5. Referring to Table 5, it may be appreciated that information about CRS capable of assuming quasi co-location (QCL) is included in each CSI-RS configuration.

TABLE 5

CSI-RS-Config NIP information elements

```
-- ASN1START
CSI-RS-ConfigNZP-r11 ::=           SEQUENCE {
   csi-RS-ConfigNZPId-r11             CSI-RS-ConfigNZPId-r11,
   antennaPortsCount-r11              ENUMERATED {an1, an2, an4, an8},
   resourceConfig-r11                 INTEGER (0 . . . 31),
   subframeConfig-r11                 INTEGER (0 . . . 154),
   scramblingIdentity-r11             INTEGER (0 . . . 503),
   qcl-CRS-Info-r11                   SEQUENCE {
      qcl-ScramblingIdentity-r11         INTEGER (0 . . . 503),
      crs-PortsCount-r11                 ENUMERATED {n1, n2, n4, spare1},
      mbsfn-SubframeConfigList-r11       CHOICE {
         release                            NULL,
         setup                              SEQUENCE {
            subframeConfigList                 MBSFN-SubframeConfigList
         }
      }                               OPTIONAL    -- Need ON
   }                                  OPTIONAL,   -- Need OR
   . . .
}
-- ASN1STOP
```

Now a description will be given of QCL between antenna ports.

If one antenna port is quasi co-located with another antenna port, this means that a UE may assume that the large-scale properties of a signal received from one antenna port (or a radio channel corresponding to the antenna port) are wholly or partially identical to those of a signal received from another antenna port (or a radio channel corresponding to the antenna port). The large-scale properties may include Doppler spread and Doppler shift which are associated with a frequency offset, average delay and delay spread which are associated with a timing offset, and average gain.

According to the definition of QCL, the UE may not assume that antenna ports that are not quasi co-located with each other have the same large-scale properties. Therefore, the UE should independently perform a tracking procedure in order to obtain the frequency offset and timing offset of each antenna port.

Meanwhile, the UE may perform the following operations regarding quasi co-located antenna ports.

1) The UE may identically apply estimated results of a power-delay profile of a radio channel corresponding to a specific antenna port, delay spread, Doppler spectrum, and Doppler spread to Wiener filter parameters used in channel estimation of a radio channel corresponding another antenna port.

2) The UE may acquire time synchronization and frequency synchronization of the specific antenna port and apply the same synchronization to another antenna port.

3) Finally, the UE may calculate the average of reference signal received power (RSRP) measurements of the quasi co-located antenna ports as an average gain.

For example, it is assumed that upon receipt of scheduling information of a DM-RS based DL data channel, e.g. DCI format 2C, through a PDCCH (or an enhanced PDCCH (E-PDCCH)), the UE performs channel estimation on a PDSCH using a DM-RS sequence indicated by the scheduling information and then demodulates data.

In this case, if a DM-RS antenna port for DL data channel demodulation is quasi co-located with a CRS antenna port of a serving cell, the UE may apply large-scale properties of a radio channel, which have been estimated from the CRS antenna port thereof, to channel estimation through the DM-RS antenna port, thereby improving the reception performance of the DM-RS based DL data channel.

Similarly, if the DM-RS antenna port for DL data channel demodulation is quasi co-located with the CSI-RS antenna port of the serving cell, the UE may apply large-scale properties of a radio channel, which have been estimated from the CSI-RS antenna port of the serving cell, to channel estimation through the DM-RS antenna port, thereby improving the reception performance of the DM-RS based DL data channel.

Meanwhile, in LTE, it is regulated that when a DL signal is transmitted in mode 10 being a CoMP transmission mode, an eNB configures one of QCL type A and QCL type B for a UE.

QCL type A is based on the premise that a CRS antenna port, a DM-RS antenna port, and a CSI-RS antenna port are quasi co-located with large-scale properties except average gain. This means that physical channels and signals are transmitted in the same point. On the other hand, QCL type B is defined such that up to four QCL modes are configured for each UE by a higher-layer message to enable CoMP transmission such as DPS or JT and which QCL mode is used to receive a DL signal is dynamically configured through DCI.

DPS transmission in the case of QCL type B will now be described in more detail.

It is assumed that node #1 having $N_1$ antenna ports transmits CSI-RS resource #1 and node #2 having $N_2$ antenna ports transmits CSI-RS resource #2. In this case, CSI-RS resource #1 is included in QCL mode parameter set #1 and CSI-RS resource #2 is included in QCL mode parameter set #2. Further, an eNB configures QCL mode parameter set #1 and CSI-RS resource #2 for a UE located within a common overage of node #1 and node #2 by a higher-layer signal.

Then, the eNB may perform DPS by configuring, using DCI, QCL mode parameter set #1 for the UE during data (i.e. a PDSCH) transmission to the UE through node #1 and configuring QCL mode parameter set #2 for the UE during data transmission to the UE through node #2. If QCL mode parameter set #1 is configured for the UE through the DCI, the UE may assume that CSI-RS resource #1 is quasi co-located with a DM-RS and if QCL mode parameter set #2 is configured for the UE, the UE may assume that CSI-RS resource #2 is quasi co-located with the DM-RS.

An active antenna system (AAS) and three-dimensional beamforming will be described below.

In a legacy cellular system, an eNB reduces ICI and increases the throughput of UEs within a cell, e.g. SINRs, by mechanical tilting or electrical tilting, which will be described below in more detail.

Figure 12:
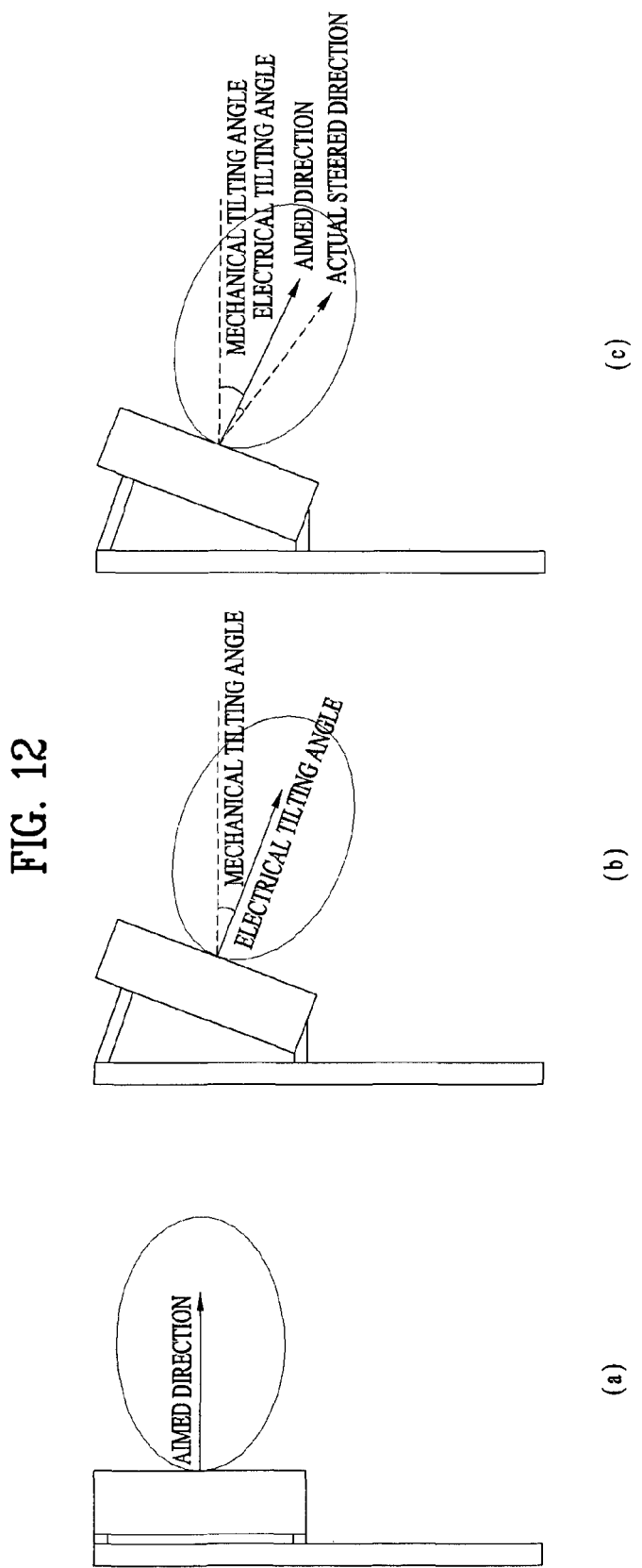
FIG. 12 is a diagram illustrating an antenna tilting scheme.

FIG. 12 is a diagram illustrating an antenna tilting scheme. Specifically, FIG. 12(a) illustrates an antenna structure to which antenna tilting is not applied, FIG. 12(b) illustrates an antenna structure to which mechanical tilting is applied, and FIG. 12(c) illustrates an antenna structure to which both mechanical tilting and electrical titling are applied.

In comparison with FIG. 12(a), mechanical tilting of FIG. 12(b) causes a beam direction to be fixed at initial antenna installation. Electrical tilting of FIG. 12(c) allows only very restrictive vertical beamforming due to cell-fixed tilting, despite the advantage of changing a tilting angle through an internal phase shift module.

Figure 13:
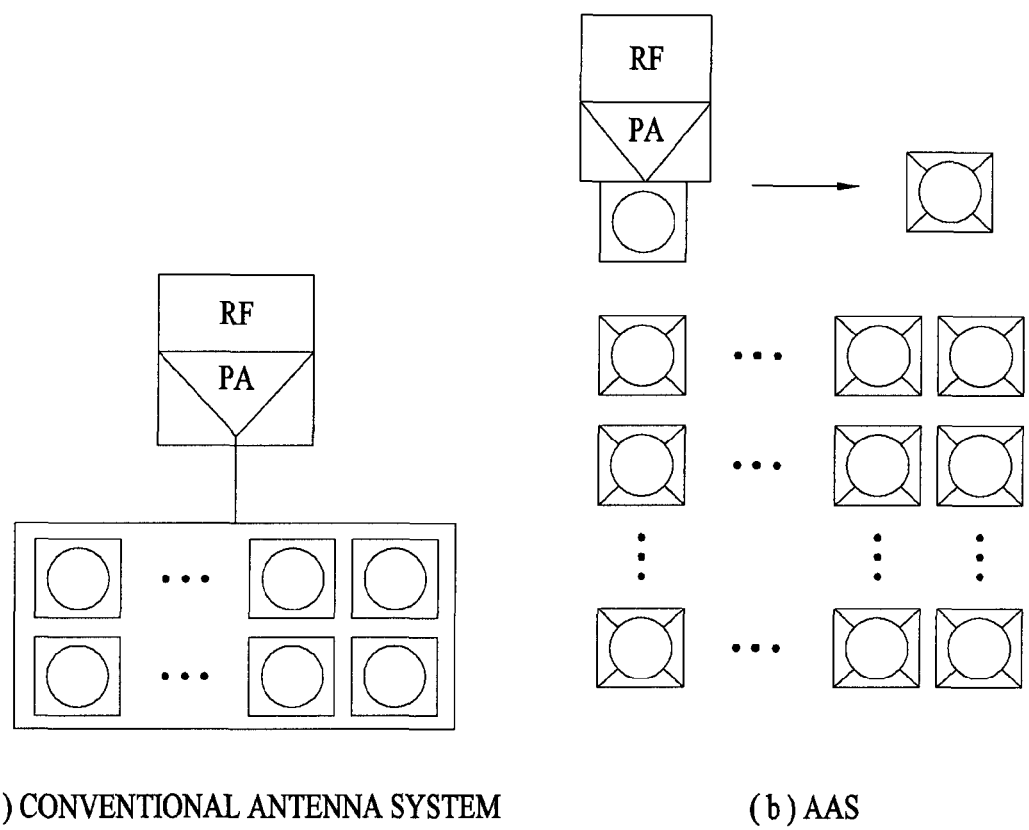
FIG. 13 is a diagram comparing a conventional antenna system with an active antenna system (AAS).

FIG. 13 is a diagram comparing a conventional antenna system with an AAS. Specifically, FIG. 13(a) illustrates the antenna system of the related art and FIG. 13(b) illustrates the AAS.

Referring to FIG. 13, as compared to the conventional antenna system, the AAS includes a plurality of antenna modules, each of which includes a radio frequency (RF) module such as a power amplifier (PA), that is, an active device so that the AAS can control the power and phase of each antenna module.

Generally, a linear array antenna, i.e. a one-dimensional array antenna, such as a ULA has been considered as a MIMO antenna structure. In a one-dimensional array structure, a beam that may be formed by beamforming exists on a two-dimensional (2D) plane. The same applies to a passive antenna system (PAS) based MIMO structure of a legacy eNB. Although a PAS based eNB has vertical antennas and horizontal antennas, the vertical antennas may not form a beam in a vertical direction and may allow only the afore-described mechanical tilting because the vertical antennas are in one RF module.

However, as the antenna structure of an eNB has evolved into an AAS, RF modules are independently configured even in vertical antennas. Consequently, vertical beamforming as well as horizontal beamforming is possible. This is called vertical beamforming or elevation beamforming.

The vertical beamforming may also be referred to as three-dimensional (3D) beamforming in that beams that can be generated according to the vertical beamforming may be formed in a 3D space in the vertical and horizontal directions. That is, the evolution of a one-dimensional array antenna structure to a 2D array antenna structure enables 3D beamforming. 3D beamforming is not necessarily formed when an antenna array is planar. Rather, 3D beamforming may be formed even in a ring-shaped 3D array structure. A feature of 3D beamforming lies in that a MIMO process is implemented on a 3D space in view of various antenna layouts other than existing one-dimensional antenna structures.

Figure 14:
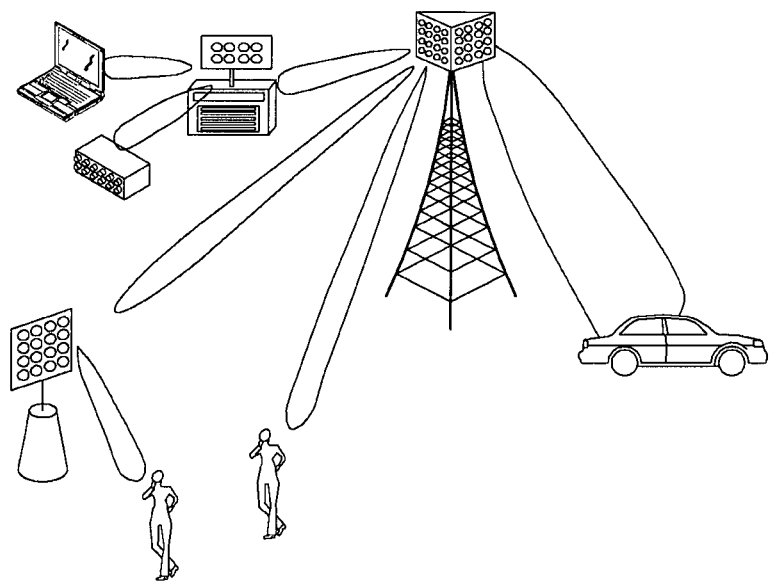
FIG. 14 illustrates exemplary UE-specific beamforming based on an AAS.

FIG. 14 illustrates exemplary UE-specific beamforming based on an AAS. Referring to FIG. 14, even though a UE moves forward or backward from an eNB as well as to the left and right of the eNB, a beam may be formed toward the UE by 3D beamforming. Therefore, a higher degree of freedom is given to UE-specific beamforming.

Further, as transmission environments using an AAS based 2D array antenna structure, not only an outdoor-to-outdoor environment where an outdoor eNB transmits a signal to an outdoor UE but also an outdoor-to-indoor (O2I) environment where an outdoor eNB transmits a signal to an indoor UE and an indoor hotspot where an indoor eNB transmits a signal to an indoor UE may be considered.

Figure 15:
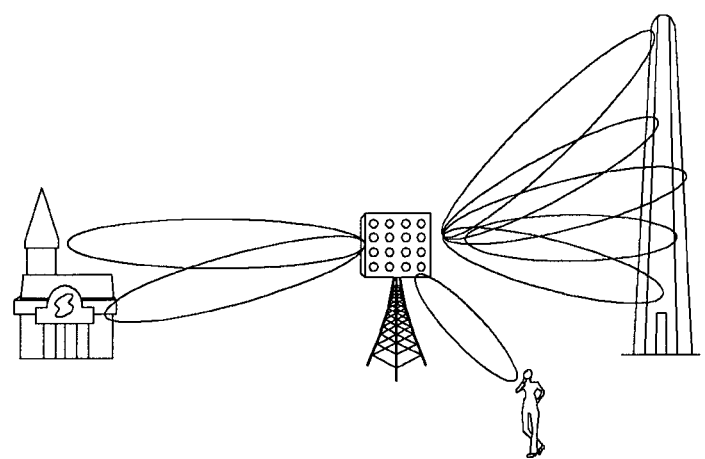
FIG. 15 illustrates an AAS based 3D beam transmission scenario.

FIG. 15 illustrates an AAS based 3D beam transmission scenario.

Referring to FIG. 15, an eNB needs to consider vertical beam steering based on various UE heights in relation to building heights as well as UE-specific horizontal beam steering in a real cell environment in which a plurality of buildings is present in a cell. Considering this cell environment, significantly different channel characteristics from those of an existing wireless channel environment, for example, shadowing/pathloss changes according to different heights, fading characteristic variations, etc. need to be reflected.

In other words, 3D beamforming is an evolution of beamforming in the horizontal direction only, based on an existing linear one-dimensional antenna array structure. 3D beamforming refers to a MIMO processing scheme performed by extending horizontal beamforming to elevation beamforming or vertical beamforming or combining horizontal beamforming with elevation beamforming or vertical beamforming, based on a multi-dimensional array antenna structure such as a planar array or on a massive antenna array.

The massive antenna array may have at least one of the following characteristics. That is, i) the massive antenna array is located on a 2D plane or a 3D space, ii) the massive antenna array includes 8 or more logical or physical antennas (the logical antennas may be expressed as antenna ports), and iii) each antenna of the massive antenna array may be configured by an AAS. However, the definition of the massive antenna array is not limited thereto.

Figure 16:
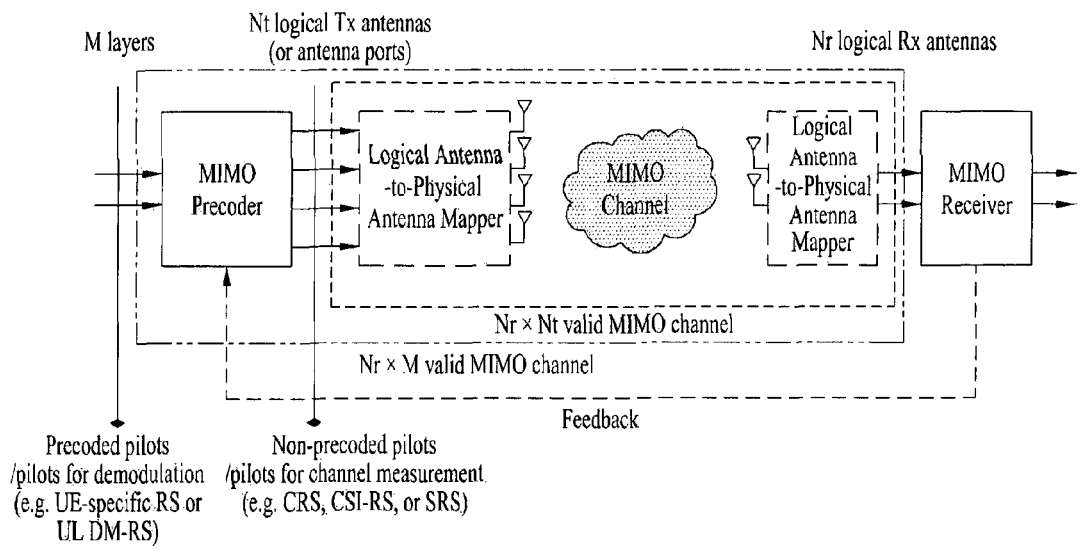
FIG. 16 illustrates a general precoding structure of a MIMO system.

FIG. 16 illustrates a general precoding structure of a MIMO system.

M spatial data streams (or layers) are mapped to Nt Tx antenna ports or Nt logical Tx antennas by a MIMO precoder, where M denotes transmission rank. Obviously, the logical antennas may not be mapped to actual physical antennas in one-to-one correspondence. For instance, if a large scale antenna array can be installed in an eNB, a plurality of physical antennas may be mapped to one logical antenna. Generally, such a logical antenna-to-physical antenna mapping relationship is not defined in communication specification standard. At a receiver, a logical Rx antenna-to-physical Rx antenna mapping relationship is configured in a similar way and streams passing through antennas are transmitted to a MIMO receiver. In a broadband system, a frequency modulation related block or module such as a subcarrier mapper/demapper may be added before or after the MIMO precoder/receiver.

Pilot signals supported in LTE may be broadly categorized into precoded pilot signals and non-precoded pilot signals according to whether MIMO precoding is applied. The non-precoded pilot signals are mainly used for channel estimation and include a CRS and a CSI-RS on DL and an SRS on UL. The precoded pilot signals are transmitted after passing through the MIMO precoder and are mainly used for transmission stream demodulation of the receiver. The precoded pilot signals include a UE-specific RS and an E-PDCCH DM-RS on DL, and a DM-RS on UL.

Each pilot signal may use a different logical antenna-to-physical antenna mapper according to type thereof. As an example, up to 8 (=Nt) Tx antennas are supported with respect to the CSI-RS, whereas only up to 4 (=Nt) Tx antennas are supported with respect to the CRS which is the same DL pilot signal as the CSR-RS.

When the precoded-pilot signals are used, the receiver may estimate an Nr×M MIMO channel matrix by measuring signals which are received at Nr Rx logical antennas from M layers. On the other hand, when the non-precoded pilot signals are used, the receiver may estimate Nr×Nt MIMO by measuring signals which are received at Nr Rx logical antennas from Nt Tx logical antennas. If pilot signals are transmitted through partial frequency resources in a broadband system, an Nr×M or Nr×Nt MIMO channel matrix for an associated frequency resource region may be estimated.

Information about the Nr×Nt channel matrix measured by the receiver from pilot signals for channel estimation is fed back to the transmitter, thereby aiding in determining a MIMO precoder used when the transmitter transmits data. Such feedback information includes, for example, an RI indicating information about the preferred number (M) of layers, a PMI indicating information about a preferred Nt×M MIMO precoder, and a covariance matrix indicating statistical characteristic information of an Nr×Nt channel.

The structure in FIG. 16 is illustrated in view of the receiver. In terms of the transmitter, the transmitter may be extended to a structure in which streams are transmitted to a plurality of receivers through respective MIMO precoders in consideration of multi-user MIMO transmission.

Meanwhile, if the number of Tx antennas increases as in a next-generation antenna system represented by the above-described massive MIMO and, thus, if the number of Tx logical antennas, Nt, is much larger than that in a conventional system, the number of channels that the receiver should estimate correspondingly increases and channel estimation becomes complicated. Such complexity may more seriously increase when the number of Rx antennas, Nr, increases. Since the number of Tx logical antennas, Nt, and the number of pilot signals for channel estimation are proportional to each other, pilot overhead needs to increase in order to maintain channel estimation performance of the same level. Furthermore, feedback overhead increases geometrically and/or feedback accuracy decreases according to increase in the number of Tx logical antennas. Consequently, as the number of Tx logical antennas increases, problems such as increase in pilot overhead, increase in feedback overhead, reduction in feedback accuracy, increase in channel estimation complexity/error, etc.

To solve the problems of increased pilot/feedback overhead and complexity according to increase in the number of Tx logical antennas, the present invention proposes configurations of a first MIMO precoder for mapping M layers to Nt' second logical antennas and a second MIMO precoder for mapping the Nt' second logical antennas to Nt (where Nt'≤Nt) first logical antennas. The configuration of the second logical antennas is adaptively determined according to a channel characteristic between a transmitter and a receiver.

Figure 17:
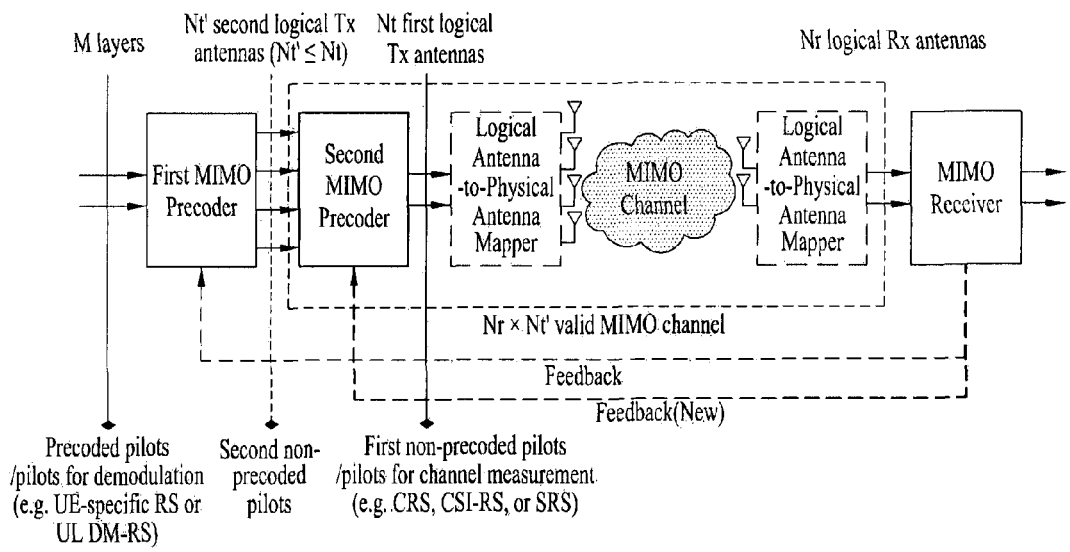
FIG. 17 illustrates a precoding structure according to the present invention.

FIG. 17 illustrates a precoding structure according to the present invention.

The second MIMO precoder serves to define a relation between the first logical antennas and the second logical antennas which are equal to or less than the first logical antennas in number. As an embodiment of the second MIMO precoder, when Nt'=2 and Nt=4, an Nt×Nt' matrix may be used as the second MIMO precoder.

$$D_1 = \sqrt{\rho_1} \begin{bmatrix} 1 & 0 & 0 & 0 \\ 0 & 1 & 0 & 0 \end{bmatrix} \qquad \text{[Equation 11]}$$

(Antenna selection type), $$D_2 = \sqrt{\rho_2/2} \begin{bmatrix} 1 & 1 & 0 & 0 \\ 0 & 0 & 1 & 1 \end{bmatrix}$$

(Partial antenna combining Type),

In the above embodiment, $\rho_1$ and $\rho_2$ are power scaling factors and values thereof may be determined depending upon whether power caused by the second MIMO precoder is decreased/increased/maintained.

As described above, the number of logical antennas determines the number of pilot signals for channel measurement in terms of the transmitter and determines the size of an effective MIMO channel for a CSI feedback configuration in terms of the receiver. In an existing system, the logical antennas are simplified for non-precoded pilot signal transmission and CSI feedback based on the non-precoded pilot signal transmission. That is, the following relationship has been satisfied: the number logical antennas=the number of transmission pilot signals of the transmitter=the number of Tx antennas in an effective MIMO channel referred to during a CSI feedback configuration of the receiver.

The present proposal defines new logical antennas, that is, second logical antennas. The proposed logical antennas may be used to reduce transmission pilot overhead in terms of the transmitter and may be used to reduce feedback overhead or raise feedback accuracy in terms of the receiver by reducing the dimensions of the effective MIMO channel referred to during the CSI feedback configuration. In this case, the number of the second logical antennas may not be equal to the number of transmission pilot signals of the transmitter according to whether a second non-precoded pilot signal is introduced and may not be equal to the number of Tx antennas in the effective MIMO channel referred to during CSI feedback configuration of the receiver according to whether CSI feedback based on the reduced dimensions of the channel is introduced. That is, the proposed logical antennas may have an effect on only one of a transmission pilot of the transmitter and a feedback channel configuration of the receiver.

The present invention is advantageous in that the number of logical antennas can be adaptively changed according to the state of the transmitter, receiver, or network. Generally, a first non-precoded pilot is determined irrespective of the receiver. When DL is considered, the first non-precoded pilot is received by all receivers (i.e. UEs) within coverage of a corresponding transmitter (i.e. eNB). For example, in the LTE system, a CRS or a CSI-RS corresponding to the first non-precoded pilot is commonly received by UEs in coverage of a corresponding eNB and is used for cell selection and handover as well as CSI feedback. Since the configuration of the first non-precoded pilot on UL is also determined according to the characteristics of the transmitter (UE), it is difficult to adaptively change the number of the first logical Tx antennas according to the receiver.

However, according to the present invention, the configuration of the second logical Tx antennas can be changed by adaptively applying the second MIMO precoder according to the receiver or the state of the receiver. The second logical Tx antennas affect the feedback configuration of the receiver or the pilot configuration of the transmitter, thereby reducing feedback overhead and/or improving accuracy or reducing pilot overhead.

First, to reduce feedback overhead and/or improve accuracy, it is proposed for the receiver to configure CSI feedback information based on an Nr×Nt' effective MIMO channel configured based on the second logical antennas.

The CSI feedback information may include not only implicit information such as a PMI and an RI but also explicit information such as a channel coefficient and a covariance matrix. Specifically, in a proposed structure, information about an Nt'×M MIMO precoder rather than information about an Nt×M MIMO precoder of a conventional structure is fed back as the implicit information and information about an Nr×Nt' channel instead of an Nr×Nt channel of the conventional structure is fed back as the explicit information.

Consequently, according to the present invention, feedback information is configured based on fewer logical antennas than the total number of Tx logical antennas of the transmitter. The second MIMO precoder determines how fewer logical antennas are formed and how to form the logical antennas. Although the transmitter may autonomously determine the configuration of the second MIMO precoder, the receiver may provide information for causing the transmitter to determine the second MIMO precoder. Accordingly, the following 1) and 2) are proposed.

1) The receiver may feed back information necessary for determining the second MIMO precoder to the transmitter through reception of the first non-precoded pilot signal. The feedback information may include at least one of the following a) to d):

a) the preferred number of second logical Tx antennas (Nt')

b) configuration information of a preferred second MIMO precoder c) first logical Tx antenna based CSI feedback information d) channel characteristic information (Doppler property, receiver mobile speed, etc.)

In the above information of a) to d), if c) first logical Tx antenna based CSI feedback information is applied, the total amount of feedback can be optimized in consideration of the amount of second logic Tx antenna based CSI feedback. For example, in an existing system, if first logical antenna based feedback of 100-bit size is performed every 5 msec, feedback of 20 bits per msec is performed. On the other hand, according to the present invention, feedback overhead can be reduced by performing first logical antenna based CSI feedback of 20-bit size every 20 msec and additionally performing second logical antenna based CSI feedback of 50-bit size every 5 msec. That is, feedback of 11 bits per msec is performed. Feedback can be reduced in a similar manner even with respect to a), b), and d) as well as to c).

In order for the receiver to measure and report a second logical antenna based channel, two methods may broadly be considered. A first method is to directly indicate information about the second MIMO precoder to the receiver. As an example of indicating the information, a scheme of configuring some candidates of the second MIMO precoder and informing the receiver of the candidates in the form of candidate indexes may be considered. After receiving the information about the second MIMO precoder, the receiver may measure an Nr×Nt' effective MIMO channel based on second logical antennas by measuring the first non-precoded pilot signal generated based on first logical antennas. For example, in a system in which a total of 100 first logical antennas (ports #0~#99) is transmitted, if the receiver is informed that the second MIMO precoder of an antenna selection type for selecting only antenna ports #10~#19 is to be used, the receiver may configure CSI feedback information by receiving an effective MIMO channel corresponding to a set of 10 second logical antennas (corresponding to antenna ports #10 to #19).

Although the above scheme can be applied for reduction of feedback overhead and/or improvement of accuracy of the receiver, pilot overhead is not reduced. Accordingly, a second method may be considered in which a transmitter transmits a new pilot signal (i.e. second non-precoded pilot signal) distinguishable per second logical antenna. In this case, the receiver may directly measure an Nr×Nt' effective MIMO channel based on the second logical antennas by receiving the second non-precoded pilot signal. Especially, this method can be used to reduce pilot overhead regardless of feedback overhead reduction and/or accuracy improvement.

2) The transmitter may transmit a pilot signal (i.e. a second non-precoded pilot signal) distinguishable per second logical antenna.

The second non-precoded pilot is a signal obtained after passing through a second MIMO precoder but not passing through the first MIMO precoder as illustrated in FIG. 17. When the second non-precoded pilot signal is transmitted along with the first non-precoded pilot signal, the first non-precoded pilot signal may be used for handover, L2 measurement such as cell selection/reselection, or determination of the second MIMO precoder. In this case, the second non-precoded pilot signal may be used for CSI measurement/feedback such as a PMI, an RI, a covariance matrix, and a channel coefficient. A different type of the first non-precoded pilot signal may be transmitted according to usage. For example, a CRS, or a reduced CRS discussed in LTE Rel-12 new carrier type (NCT) may be used for L2 measurement and a CSI-RS may be used for determination of the second MIMO precoder.

When the second non-precoded pilot is introduced, pilot overhead can be reduced. For example, in a system for transmitting a total of 100 non-precoded pilot signals (e.g. CSI-RSs) every 5 msec, pilot overhead may correspond to 20 pilot resources per msec. In this system, assuming that the transmission cycle of the first precoded pilot signals increases to 20 msec, the proposed second pilot signals are transmitted every 5 msec, and the number of second logical antennas is reduced to 20 by the second MIMO precoder, overall pilot overhead is 9 pilot resources per msec, which is reduced by twice or more the pilot overhead of the above example.

In addition, since the second precoding pilot signals are determined according to a channel environment between the transmitter and the receiver, pilot overhead such as the transmission cycle of the second precoded pilot signals or the frequency transmission density of the second precoded pilot signals can be optimized by the channel situation of the receiver.

Table 6 listed below shows comparison between beams transmitted through 16 antennas in the form of 4 rows by 4 columns and beams transmitted by 64 antennas in the form of 8 rows by 8 columns. Referring to Table 6, as the number of antennas of the eNB increases, the width of beams generated by eNB is reduced and the shape of the beams becomes sharp, thereby resulting in increase of beam gain. During closed-loop MIMO transmission, as a beam becomes sharper, a PMI at a timing measured by the UE and a PMI at a timing actually transmitted by an eNB are inconsistent, despite slight change in a channel. As a result, performance is significantly degraded. In other words, performance sensitivity for feedback may greatly increase.

TABLE 6

|  | 16 Tx Case | 64 Tx Case |
| --- | --- | --- |
| Design frequency (GHz) | 2 | 2 |
| Array config | 4 × 4 | 8 × 8 |
| Antenna dimension (Half Length | 30 mm | 30 mm |
| elements distance | dx: 75 mm dy: 75 mm | dx: 75 mm dy: 75 mm |
| Fractional bandwidth (MHz) | 1.89 GHz~2.15 GHz (260 Mz) | 1.89 GHz~2.15 GHz (260 Mz) |
| VSWR | Max 2:1 | Max 2:1 |
| Radiation pattern shape | Directional | Directional |
| Max. gain (dB) | 19.52 | 25.54 |
| Radiation efficiency (%) | 100% | 100% |
| HPBW_E-plane (°) | 26 | 12 |
| HPBW_H-plane (°) | 24 | 12 |

Therefore, if the second MIMO precoder adaptively configures the number of Tx antennas according to mobility of the UE or a Doppler characteristic using the structure proposed in the present invention, the UE can perform feedback according to the corresponding number of antennas. For instance, in an environment in which the number of first logical antennas is 8, the second MIMO precoder may adaptively configure 8 second logical antennas when the UE has a low-mobility characteristic, 4 second logical antennas when the UE has a middle-mobility characteristic, and one second logical antenna when the UE has a high-mobility. That is, an adaptive partial array beamforming is applied When such adaptive partial array beamforming is applied in a 3D beamforming environment, dimensions may be independently controlled with respect to pilot signals transmitted in the vertical direction and horizontal direction of an antenna array. In addition, dimensions may also independently controlled with respect to information to be fed back by the receiver in the vertical direction and horizontal direction of the antenna array.

Meanwhile, there is a high probability that the number of antennas of the eNB is much more than the number of antennas of the UE in a massive antenna array system. Applying the proposed structure, sub-array based multi-user beamforming is easily supported.

Figure 18:
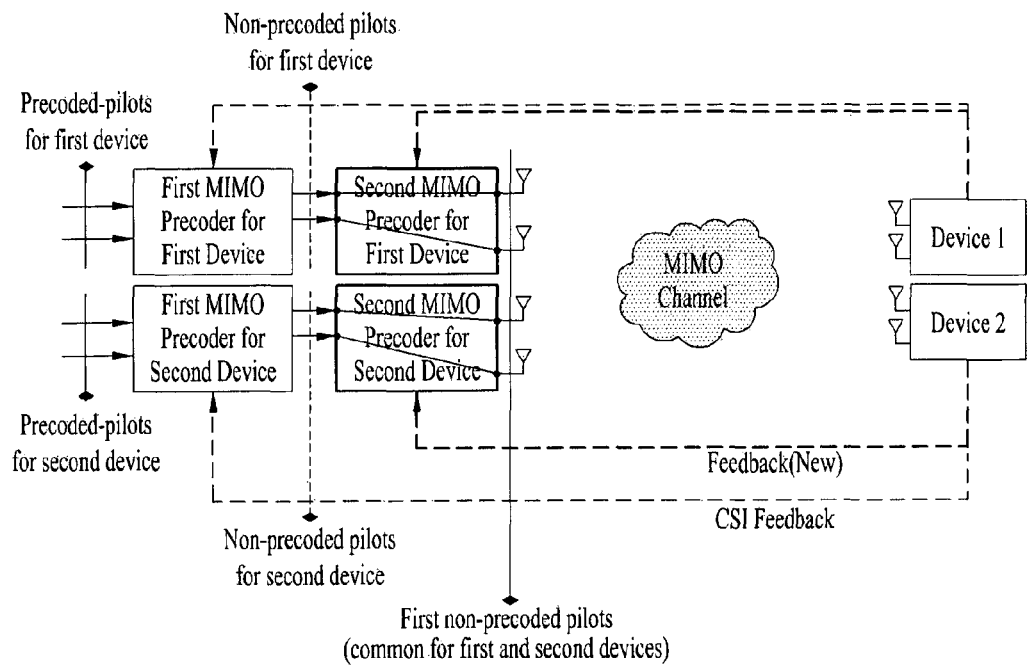
FIG. 18 illustrates a communication system supporting sub-array based multi-user beamforming according to the present invention.

FIG. 18 illustrates a communication system supporting sub-array based multi-user beamforming according to the present invention.

Referring to FIG. 18, when an eNB includes 100 antennas and five UEs are present in coverage of the eNB, the eNB may support the five UEs using 20 antennas dividing 100 antennas by 5. Although 20 or more antennas may be supported per UE in the case in which two or more UEs are supported by one antenna, that is, a plurality of UEs is mapped to one antenna in a UE-to-antenna mapping relationship, this is excluded for convenience of description.

Then, each UE configures feedback based on 20 second logical antennas, thereby reducing feedback overhead and/or improving accuracy. Although a total of 100 pilot resources is used in terms of the eNB because the overhead of second non-precoded pilot signals is 20 pilot resources per UE, the eNB may independently controls the transmission cycle or frequency density of the second non-precoded pilot signals according to a situation of each UE. Therefore, actual pilot overhead reduction and/or accuracy can be remarkably improved relative to a conventional system.

Hereinafter, a method for transmitting a first non-precoded pilot signal for a first logical antenna and a second non-precoded pilot signal for a second logical antenna, using CSI-RS resources defined in an LTE system will be proposed. The eNB defines a first type CSI-RS and a second type CSI-RS having characteristics shown in Table 7 and Table 8, respectively, for the UE.

TABLE 7

| $1^{st}$ type CSI-RS |
| --- |
| Number of (co-located) antenna ports: Nt (>Nt') At least one of the following information is measured/reported based on $1^{st}$ type CSI-RS resource Type1 PMI preferred Nt' preferred Nt_h' & Nt_v' |

TABLE 8

| 2nd type CSI-RS |
| --- |
| Number of (co-located) antenna ports: Nt' (<Nt) At least one of the following information is measured/reported based on $2^{nd}$ type CSI-RS resource Type2 PMI CQI RI |

The first type CSI-RS of Table 7 corresponds to the first non-precoded pilot signal and the second type CSI-RS of Table 8 corresponds to the second non-precoded pilot signal.

In Table 7, Nt_h' and Nt_v' indicate the preferred number of antennas in a horizontal direction and the preferred number of antennas in a vertical direction, respectively, in a 2D antenna array. In addition, in Table 7, the type 1 PMI denotes an ID for a matrix (Nt'×Nt) constituting a second precoder. The type 1 PMI may include an antenna selective matrix or a partial antenna combining type matrix.

In Table 8, type 2 PMI denotes an index for a precoding matrix (Rank×Nt') preferred by the UE with respect to an effective channel defined by the second precoder and is information for recommending a precoding matrix to be used by the eNB to transmit DL data, wherein the information may be used as a precoding matrix during transmission of a PDSCH and a UE-specific RS.

In a 3D beamforming environment, the type 1 PMI and type 2 PMI may be configured by a vertical PMI (hereinafter, V-PMI) and a horizontal PMI (hereinafter, H-PMI. For example, the UE may feed back, instead of the type 1 PMI, a type 1 H-PMI and a type 1 V-PMI for the row and column of a whole antenna array transmitting the first non-precoded pilot signal. Similarly, the UE may feed back, instead of the type 2 PMI, a type 2 H-PMI and a type 2 V-PMI for the row and column of a subantenna array transmitting the second non-precoded pilot signal. The eNB may obtain a final precoding matrix by taking the Khatri-Rao product (column-wise Kronecker product) of the V-PMI and H-PMI received from the UE.

The second type CSI-RS of Table 8 is a CSI-RS for CSI feedback and may be configured in association with NZP CSI-RS resource configuration, CSI-IM resource configuration, and periodic/aperiodic CSI reporting configuration, similarly to a CSI process defined in an LTE system.

In addition, the first type CSI-RS of Table 7 is a pilot signal for configuring the second precoder and needs not be associated with CSI-IM resource configuration and periodic/aperiodic CSI reporting configuration because there is no need to be associated with CSI feedback for CQI/RI information unlike the second type CSI-RS. Meanwhile, the first type CSI-RS should be associated with a new reporting configuration for configuring the second precoder. At least one of the type 1 PMI, preferred Nt', preferred Nt_v', and preferred Nt_h' may be reported. Hereinafter, feedback of the UE including the above information will be referred to as dimension reducer information (DRI) reporting. Consequently, the first type CSI-RS is associated with DRI reporting and the second type CSI-RS is associated with CSI reporting.

The first type CSI-RS and the second type CSI-RS are not necessarily configured by a single NZP CSI-RS resource. That is, each of the first type CSI-RS and the second type CSI-RS may be configured by a plurality of NZP CSI-RS resources. For example, eight 8Tx NZP CSI-RS resources may be included in the first type CSI-RS so that a first type CSI-RS resource including 64 (=8×8=Nt) antenna ports may be configured. In addition, four 4Tx NZP CSI-RS resources may be included in the second type CSI-RS so that a second type CSI-RS resource including 16 (=4×4=Nt') antenna ports may be configured.

In this case, the total number (Nt or Nt') of antenna ports included in a plurality of NZP CSI-RS resources may not be equal to the total number of Tx antennas of a MIMO channel in a receiver. For example, if a specific physical antenna is included in two or more NZP CSI-RS resources, the total number of Tx antennas of the MIMO channel configured in the receiver may be less than the total number of antenna ports included in the NZP CSI-RS resources. As another example, when the receiver can estimate a corresponding channel using channel correlation although a specific physical antenna does not transmit a CSI-RS port, the total number of Tx antennas of a MIMO channel configured in the receiver may be greater than the total number of antenna ports included in the NZP CSI-RS resources.

Based on the above discussion, DRI reporting configuration and CSI reporting configuration may be defined as in a DRI Reporting IE of Table 9 and a CSI Process IE of Table 10. First, similarly to a conventional scheme, a plurality of NZP CSI-RS resources is set to a CSI-RS-ConfigNZP IE. In this case, each NZP CSI-RS resource has an ID called csi-RS-ConfigNZPId.

TABLE 9

DRI reporting IE
DRI-reporting := {
    csi-RS-ConfigNZPId
    P-C
    DRI-reporting-Periodic
    DRI-reporting-Aperiodic
}

TABLE 10

CSI process IE
CSI-Process := {
    csi-RS-ConfigNZPId
    P-C
    csi-IM-ConfigId
    CSI-reporting-Periodic
    CSI-reporting-Aperiodic
}

In Table 9 and Table 10, csi-RS-ConfigNZPId is information indicating an NZP CSI-RS resource and may include information about a plurality of NZP CSI-RS resources capable of assuming QCL, for example, a CSI-RS resource ID. In addition, in Table 9 and Table 10, P-C indicates a power control parameter for a CSI-RS of each type.

In Table 9, DRI-reporting-Periodic indicates configuration for periodic DRI reporting and DRI-reporting-Aperiodic indicates configuration for aperiodic DRI reporting. In Table 10, CSI-reporting-Periodic indicates configuration for periodic CSI reporting and CSI-reporting-Aperiodic is configuration for aperiodic CSI reporting. Additionally, the CSI Process IE of Table 10 is information about CSI-RS resources for interference measurement during CSI calculation and includes csi-IM-ConfigId.

CSI-RS ports included in the DRI Reporting IE constitutes the first type CSI-RS resource and CSI-RS ports included in the CSI Process IE constitutes the second type CSI-RS resource. Accordingly, when the type 1 PMI is configured using an antenna selective matrix, CSI-RS ports belonging to the CSI Process IE and CSI-RS ports belonging to the DRI Reporting IE may satisfy a relationship of including each other.

Meanwhile, the number of first logical Tx antennas, Nt, corresponds to the total number of NZP CSI-RS ports included in the CSI Process IE, that is, the total number of CSI-RS ports included in each resource when a plurality of NZP CSI-RS resources is used. The number of second logical Tx antennas, Nt', corresponds to the total number of NZP CSI-RS ports included in the DRI Reporting IE.

Additionally, a transmission period of the first type CSI-RS may be longer than a transmission period of the second type CSI-RS in order to reduce pilot overhead. Moreover, to reduce feedback overhead, feedback for the first type CSI- RS (i.e. DRI feedback) may be set to be reported with longer period than feedback for the second type CSI-RS (i.e. CSI feedback).

When it is desired to dynamically configure the second precoder to suit an environment in which mobility of the UE greatly varies, the first type CSI-RS and/or corresponding feedback may be configured through lower layers, for example, a physical layer, a MAC layer, etc. For example, the second type CSI-RS (possibly, including CSI feedback) may be included in RRC IE information and may be configured in an RRC layer. In addition, the first type CSI-RS (possibly, including DRI feedback) may be included in DCI/UCI information and may be configured in the physical layer.

Figure 19:
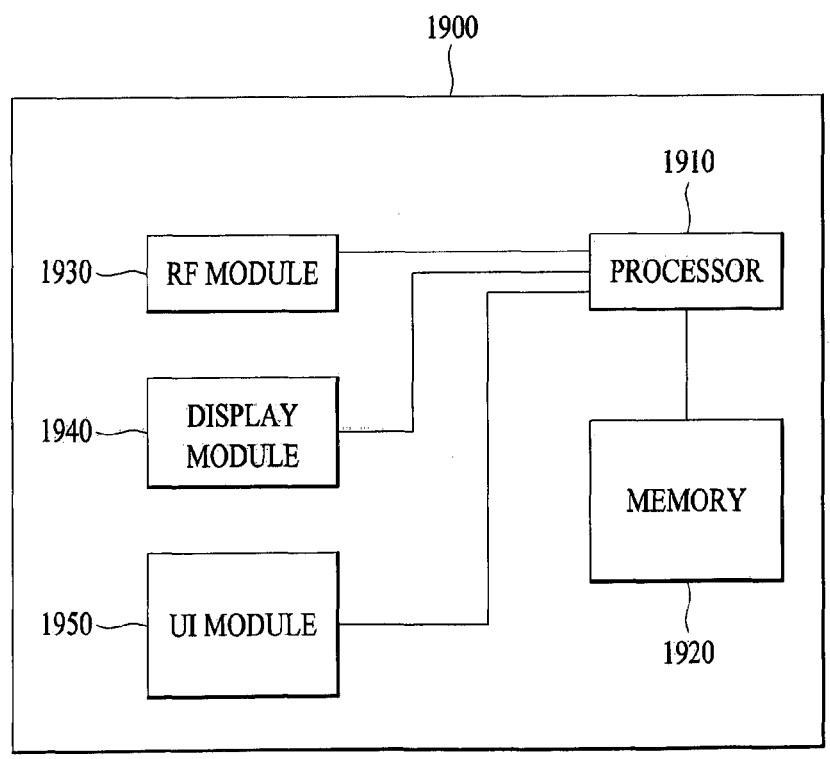
FIG. 19 is a block diagram of a communication apparatus according to an embodiment of the present invention.

FIG. 19 is a block diagram of a communication apparatus according to an embodiment of the present invention.

Referring to FIG. 19, a communication device 1900 includes a processor 1910, a memory 1920, a radio frequency (RF) module 1930, a display module 1940, and a user interface (UI) module 1950.

The communication device 1900 is illustrated for convenience of description and some modules may be omitted. The communication device 1900 may further include necessary modules. Some modules of the communication device 1900 may be further divided into sub-modules. The processor 1900 is configured to perform operations according to the embodiments of the present invention exemplarily described with reference to the drawings. Specifically, for a detailed description of operations of the processor 1900, reference may be made to the description described with reference to FIGS. 1 to 18.

The memory 1920 is connected to the processor 1910 and stores operating systems, applications, program code, data, and the like. The RF module 1930 is connected to the processor 1910 and performs a function of converting a baseband signal into a radio signal or converting a radio signal into a baseband signal. For this, the RF module 1930 performs analog conversion, amplification, filtering, and frequency upconversion or performs inverse processes thereof. The display module 1940 is connected to the processor 1910 and displays various types of information. The display module 1940 may include, but is not limited to, a well-known element such as a liquid crystal display (LCD), a light emitting diode (LED), or an organic light emitting diode (OLED). The UI module 1950 is connected to the processor 1910 and may include a combination of well-known UIs such as a keypad and a touchscreen.

The above-described embodiments are combinations of elements and features of the present invention in a predetermined manner. Each of the elements or features may be considered selective unless mentioned otherwise. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. In the appended claims, claims that are not explicitly dependent upon each other may of course be combined to provide an embodiment or new claims can be added through amendment after the application is filed.

In this document, a specific operation described as performed by an eNB may be performed by an upper node of the eNB. Namely, it is apparent that, in a network comprised of a plurality of network nodes including an eNB, various operations performed for communication with a UE may be performed by the eNB, or network nodes other than the eNB. The term eNB may be replaced with the terms fixed station, Node B, eNode B (eNB), access point, etc.

The embodiments according to the present invention can be implemented by various means, for example, hardware, firmware, software, or combinations thereof. In the case of a hardware configuration, the embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In the case of a firmware or software configuration, the method according to the embodiments of the present invention may be implemented by a module, a procedure, or a function, which performs functions or operations described above. For example, software code may be stored in a memory unit and then may be executed by a processor. The memory unit may be located inside or outside the processor to transmit and receive data to and from the processor through various well-known means.

INDUSTRIAL APPLICABILITY

While the above-described method and apparatus for transmitting an RS based on adaptive antenna scaling in a wireless communication system have been described in the context of a 3GPP LTE system, the present invention is also applicable to many other wireless communication systems in addition to 3GPP LTE. In addition, the method and apparatus may be applied to antenna structures other than a massive antenna structure.

The present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents and all changes coming within the meaning and equivalency range of the appended claims are intended to be embraced therein.

The invention claimed is:

1. A method for transmitting a signal to a receiver by a transmitter in a wireless communication system, the method comprising:
    transmitting information about a first non-precoded pilot signal and information about a second non-precoded pilot signal to the receiver;
    transmitting the first non-precoded pilot signal and the second non-precoded pilot signal to the receiver; and
    transmitting one or more transmission streams to the receiver through first logical antenna ports and second logical antenna ports;
    wherein the number of the first logical antenna ports is less than or equal to the number of the second logical antenna ports, and
    the first non-precoded pilot signal is a pilot signal for measuring channel state information at the receiver and the second non-precoded pilot signal is a pilot signal for determining the number of the first logical antenna ports.

2. The method according to claim 1, wherein the information about the second non-precoded pilot signal includes information about the number of the second logical antenna ports and information about feedback based on the second non-precoded pilot signal.

3. The method according to claim 2, wherein the information about feedback based on the second non-precoded pilot signal includes at least one of precoding matrix information for mapping the second logical antenna ports and the first logical antenna ports and information about the preferred number of the first logical antenna ports.

4. The method according to claim 1, wherein the information about the first non-precoded pilot signal includes information about the number of the first logical antenna ports and information about feedback based on the first non-precoded pilot signal.

5. The method according to claim 4, wherein the information about feedback based on the first non-precoded pilot signal includes at least one of precoding matrix information for mapping a transport layer and the first logical antenna ports, channel state information, and a rank indicator.

6. The method according to claim 1, wherein the first non-precoded pilot signal and the second non-precoded pilot signal are defined as channel state information reference signals (CSI-RSs) and the information about the first non-precoded pilot signal and the information about the second non-precoded pilot signal include identities indicating one or more CSI-RS resources.

7. The method according to claim 1, wherein a transmission period of the second non-precoded pilot signal is longer than a transmission period of the first non-precoded pilot signal.

8. A method for receiving a signal from a transmitter by a receiver in a wireless communication system, the method comprising:
receiving information about a first non-precoded pilot signal and information about a second non-precoded pilot signal from the transmitter;
receiving the first non-precoded pilot signal and the second non-precoded pilot signal from the transmitter; and
receiving one or more transmission streams from the transmitter through first logical antenna ports and second logical antenna ports of the transmitter;
wherein the number of the first logical antenna ports is less than or equal to the number of the second logical antenna ports, and
the first non-precoded pilot signal is a pilot signal for measuring channel state information at the receiver and the second non-precoded pilot signal is a pilot signal for determining the number of the first logical antenna ports.

9. The method according to claim 8, wherein the information about the second non-precoded pilot signal includes information about the number of the second logical antenna ports and information about feedback based on the second non-precoded pilot signal.

10. The method according to claim 9, wherein the information about feedback based on the second non-precoded pilot signal includes at least one of precoding matrix information for mapping the second logical antenna ports and the first logical antenna ports and information about the preferred number of the first logical antenna ports.

11. The method according to claim 8, wherein the information about the first non-precoded pilot signal includes information about the number of the first logical antenna ports and information about feedback based on the first non-precoded pilot signal.

12. The method according to claim 11, wherein the information about feedback based on the first non-precoded pilot signal includes at least one of precoding matrix information for mapping a transport layer and the first logical antenna ports, channel state information, and a rank indicator.

13. The method according to claim 8, wherein the first non-precoded pilot signal and the second non-precoded pilot signal are defined as channel state information reference signals (CSI-RSs) and the information about the first non-precoded pilot signal and the information about the second non-precoded pilot signal include identities indicating one or more CSI-RS resources.

14. The method according to claim 8, wherein a transmission period of the second non-precoded pilot signal is longer than a transmission period of the first non-precoded pilot signal.

* * * * *